US010016011B2

(12) United States Patent
Tawney et al.

(10) Patent No.: US 10,016,011 B2
(45) Date of Patent: Jul. 10, 2018

(54) INJECTED FOOTWEAR

(71) Applicant: Fuerst Group, Inc., Menlo Park, CA (US)

(72) Inventors: John Tawney, Portland, OR (US); Carina Hamel, Portland, OR (US); Rory Fuerst, Jr., Portland, OR (US)

(73) Assignee: Fuerst Group, Inc., Menlo Park, CA (US)

(*) Notice: Subject to any disclaimer, the term of this patent is extended or adjusted under 35 U.S.C. 154(b) by 362 days.

(21) Appl. No.: 13/750,855

(22) Filed: Jan. 25, 2013

(65) Prior Publication Data

US 2013/0192086 A1 Aug. 1, 2013

Related U.S. Application Data

(60) Provisional application No. 61/591,736, filed on Jan. 27, 2012.

(51) Int. Cl.
*A43B 9/00* (2006.01)
*A43B 7/28* (2006.01)
(Continued)

(52) U.S. Cl.
CPC .................. *A43B 9/00* (2013.01); *A43B 7/28* (2013.01); *A43B 9/02* (2013.01); *A43B 23/0295* (2013.01);
(Continued)

(58) Field of Classification Search
CPC ......... A43B 9/00; A43B 7/28; A43B 23/0245; A43B 1/14; A43B 3/0036; A43B 9/18;
(Continued)

(56) References Cited

U.S. PATENT DOCUMENTS 2,794,270 A * 6/1957 Dubner .................. A43B 3/10
264/263
3,121,430 A * 2/1964 O'Reilly ..................... 36/154
(Continued)

FOREIGN PATENT DOCUMENTS

EP 0823323 A1 2/1998
EP 1243190 A1 9/2002
(Continued)

OTHER PUBLICATIONS

Korean Intellectual Property Office, International Search Report and Written Opinion of PCT/US2013/023285, WIPO, dated Jun. 2, 2013, 9 pages.

*Primary Examiner* — Jila M Mohandesi
(74) *Attorney, Agent, or Firm* — McCoy Russell LLP

(57) ABSTRACT

Port-injection footwear is provided. In one example, port-injection footwear is provided including a footwear-structure bag encompassing an injected foam. In some examples, the footwear-structure bag may form an integrated footwear component. The port-injection footwear further may include a foam barrier disposed adjacent to the footwear-structure bag to retain the injected foam within the bag during injection. An outsole may be directly coupled to the footwear-structure bag forming a base of the footwear article. In other examples, the port-injection footwear may include a footwear-structure bag having an injection port, an injected foam retained in the footwear-structure bag, where the injected foam was injected through the injection port, and a port cap positioned at the injection port of the footwear-structure bag.

22 Claims, 15 Drawing Sheets

(51) Int. Cl.
    *A43B 9/02*     (2006.01)
    *A43B 23/02*    (2006.01)
    *B29D 35/00*    (2010.01)
    *B29D 35/14*    (2010.01)

(52) U.S. Cl.
    CPC ....... *B29D 35/0009* (2013.01); *B29D 35/142* (2013.01); *B29D 35/146* (2013.01)

(58) Field of Classification Search
    CPC .............. A43B 23/0205; B29D 35/146; B29D 35/0009; B29D 35/06
    USPC ....... 36/87, 98, 45, 47, 48, 88, 154, 93, 3 A, 36/84
    See application file for complete search history.

(56) References Cited

U.S. PATENT DOCUMENTS

| | | | | |
|---|---|---|---|---|
| 3,786,580 | A * | 1/1974 | Dalebout | A43B 5/0405 12/142 P |
| 3,896,202 | A * | 7/1975 | Palau | A43B 5/0405 264/154 |
| 3,921,313 | A | 11/1975 | Mahide et al. | |
| 4,042,663 | A | 8/1977 | Harder, Jr. | |
| 4,120,064 | A * | 10/1978 | Salomon | A43B 5/0405 12/142 R |
| 4,128,951 | A * | 12/1978 | Tansill | A43B 7/28 36/44 |
| 4,245,410 | A * | 1/1981 | Molitor | A43B 7/12 36/117.1 |
| 4,301,564 | A * | 11/1981 | Dalebout | A43B 3/0084 12/142 P |
| 4,333,193 | A | 6/1982 | Bartneck | |
| 4,414,762 | A * | 11/1983 | Salomon | A43B 5/0405 12/142 P |
| 4,428,089 | A * | 1/1984 | Dawber | A43B 5/0405 12/142 R |
| 4,744,157 | A * | 5/1988 | Dubner | 36/88 |
| 5,101,580 | A * | 4/1992 | Lyden | 36/93 |
| 5,353,525 | A * | 10/1994 | Grim | 36/88 |
| 5,360,831 | A | 11/1994 | Lidy et al. | |
| 5,667,738 | A * | 9/1997 | Krajcir | 264/45.5 |
| 5,785,909 | A | 7/1998 | Chang et al. | |
| 6,024,712 | A | 2/2000 | Iglesias et al. | |
| 6,026,595 | A * | 2/2000 | Curry | 36/93 |
| 6,050,964 | A | 8/2000 | Yates | |
| 6,226,895 | B1 | 5/2001 | McClelland | |
| 6,314,663 | B1 * | 11/2001 | Saldana | 36/28 |
| 6,604,302 | B2 | 8/2003 | Polegato Moretti | |
| 6,746,027 | B1 * | 6/2004 | Soo | 280/11.26 |
| 6,763,609 | B2 | 7/2004 | Su | |
| 7,081,221 | B2 | 7/2006 | Paratore et al. | |
| 7,131,220 | B1 * | 11/2006 | Richey | A43B 5/0407 36/29 |
| 8,215,032 | B2 | 7/2012 | Sokolowski et al. | |
| 8,800,085 | B2 * | 8/2014 | Sussmann | A43B 13/125 12/142 E |
| 8,857,076 | B2 * | 10/2014 | Langvin et al. | 36/29 |
| 2001/0016992 | A1 * | 8/2001 | Gross | 36/84 |
| 2001/0032399 | A1 * | 10/2001 | Litchfield et al. | 36/88 |
| 2002/0053148 | A1 * | 5/2002 | Haimerl | 36/55 |
| 2003/0046831 | A1 * | 3/2003 | Westin | 36/29 |
| 2004/0231190 | A1 * | 11/2004 | Seamans | 36/11.5 |
| 2005/0060914 | A1 * | 3/2005 | Fuerst | 36/102 |
| 2007/0011914 | A1 * | 1/2007 | Keen et al. | 36/50.1 |
| 2009/0320329 | A1 * | 12/2009 | Darby et al. | 36/140 |
| 2010/0050470 | A1 | 3/2010 | Hubner | |
| 2010/0242312 | A1 * | 9/2010 | Lim et al. | 36/3 A |
| 2012/0056345 | A1 | 3/2012 | Lee | |
| 2013/0192086 | A1 * | 8/2013 | Tawney et al. | 36/12 |

FOREIGN PATENT DOCUMENTS

| | | |
|---|---|---|
| JP | H1175908 A | 3/1999 |
| WO | 2010003414 A1 | 1/2010 |

* cited by examiner

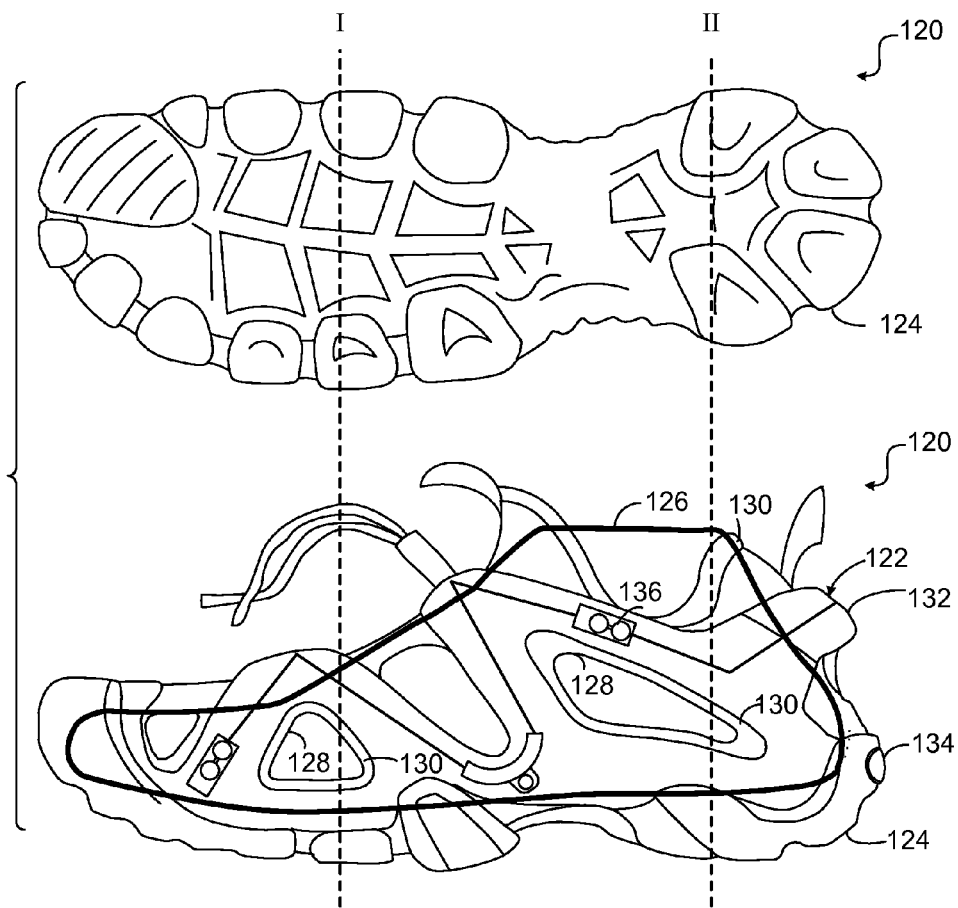
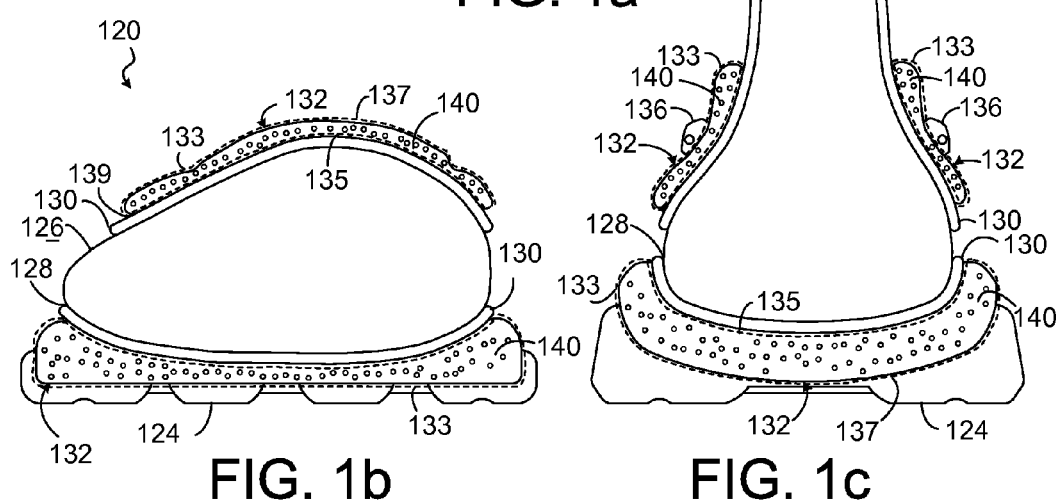
FIG. 1a
FIG. 1b   FIG. 1c

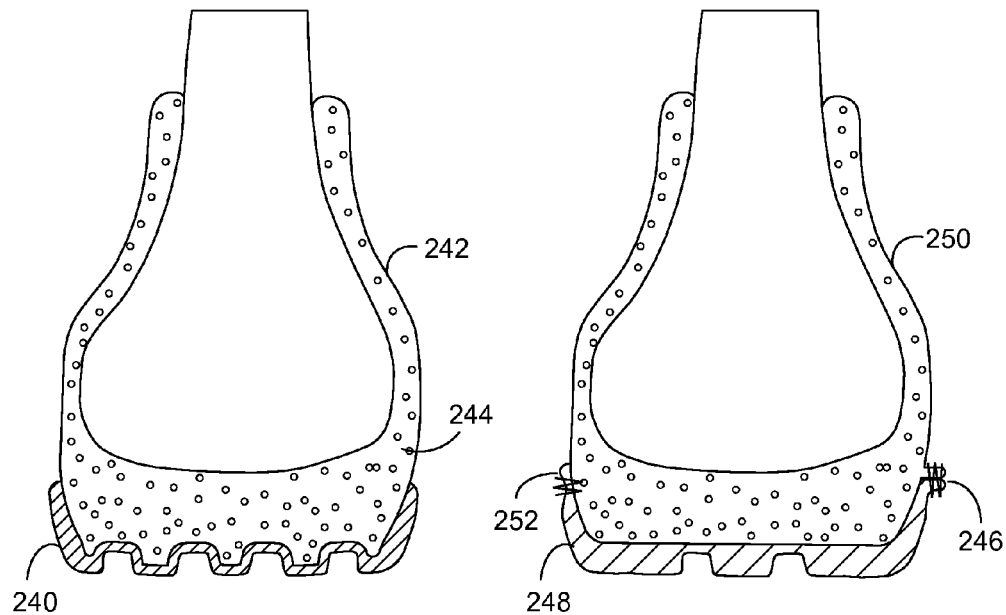
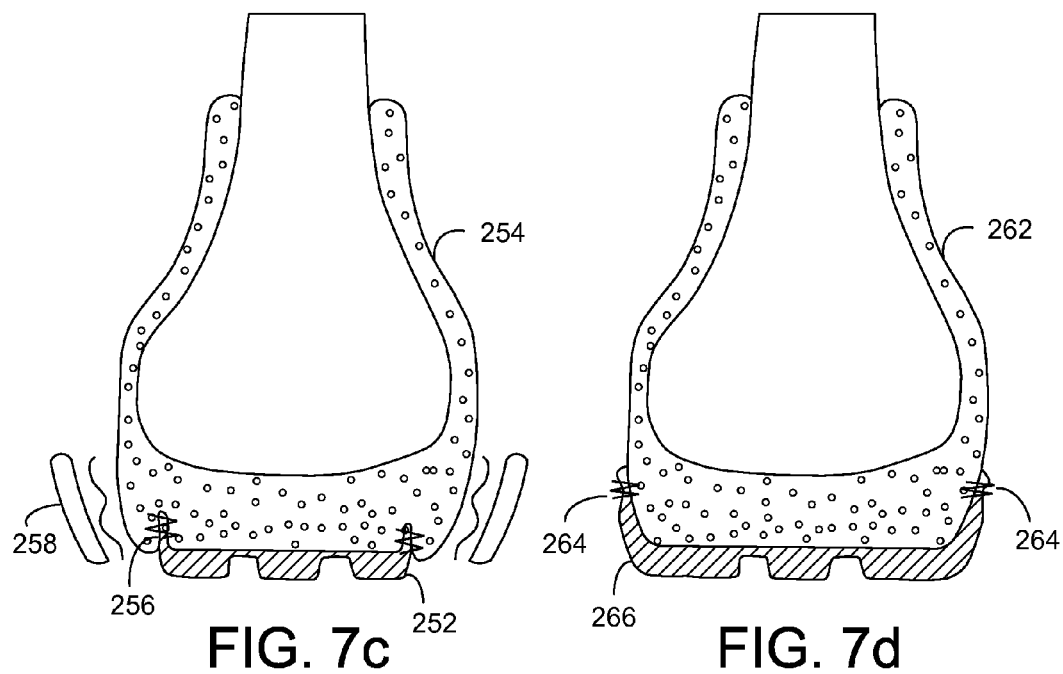

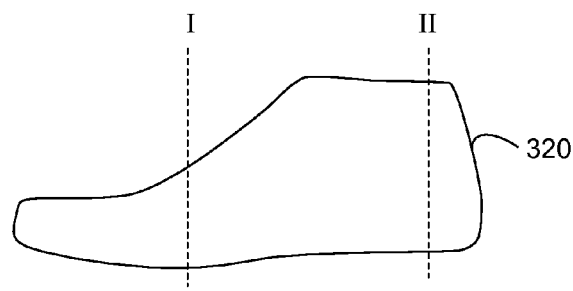
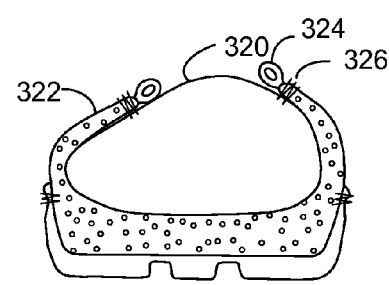
FIG. 10a  FIG. 10b
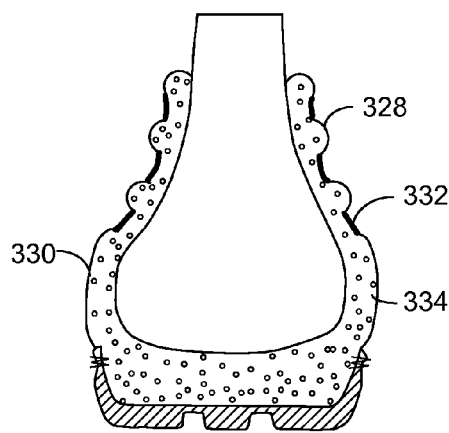
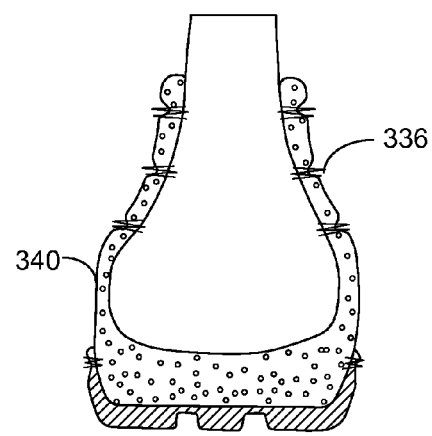
FIG. 10c  FIG. 10d
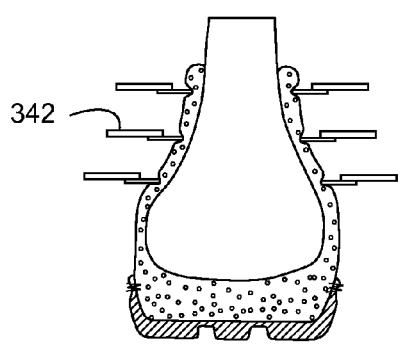
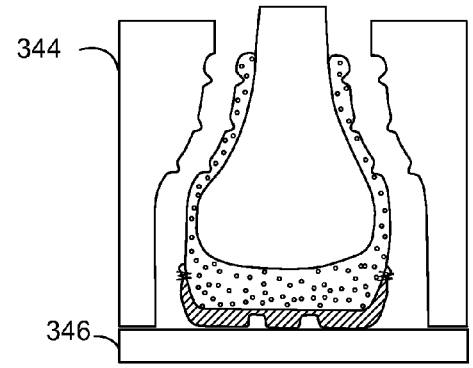
FIG. 10e  FIG. 10f

INJECTED FOOTWEAR

CROSS-REFERENCE TO RELATED APPLICATIONS

This application claims priority to U.S. Provisional Patent Application No. 61/591,736, entitled "Injected Footwear", filed Jan. 27, 2012, the entirety of which is hereby incorporated by reference for all purposes.

BACKGROUND/SUMMARY

Conventional footwear manufacture has continued to rely on hand-stitching and adhesives to assemble footwear components into a finalized product. For example, individual components comprising the lower (e.g. outsoles) and uppers (used herein to refer to midsoles, side walls, and other upper components), may be hand-stitched and/or adhered together to form a finished product. The reliance on manual labor and the assembly from multiple components results in variations in the footwear, including variations in sizing.

To accommodate the variety of methods and tools for making various shoe styles, a single footwear manufacturer may maintain many types of skilled labor, stocks of raw materials and production machinery that are used to produce a variety of footwear elements. The variety in manufacture complicates shoe construction across an entire product line and may cause further difficulty in achieving uniform sizing.

As mentioned above, to assemble the many individual components, footwear construction approaches commonly use solvent-based adhesives to bond various components together. For example, solvent-based adhesives, including organic solvents, may be used in the footbed, the outsole, the midsole, the insole, etc. Different materials may be coupled together using adhesives such that the footwear is held together primarily by adhesives.

When used in the construction process, solvent-based adhesives may emit volatile organic compounds (VOCs), which can produce indoor and/or outdoor air pollution, and thus, degrade the quality of the environment. In addition to emissions generated during the application and/or curing processes, excess adhesive in the manufacturing process may also be considered environmental waste, also potentially impacting the quality of the environment. In fact, various regulations exist with regard to use, handling, and disposal of solvent-based adhesives.

In addition to the use of adhesives, traditional injection molding is typically used to form components or portions of components of footwear. Many outsoles, midsoles and even uppers are produced by injection of a hardenable thermoplastic material, typically polyurethane, into preformed molds. Conventional methods of injection molding inject the material into a mold, which seals around the material as it dries. Molds that are worn, poorly constructed or overfilled may not form an effective seal resulting in material spilling beyond the mold, known as flashing. Because the moldable material is injected directly into the mold, traditional injection molding requires extensive cleaning upon removal of hardened products. Additionally, every variation to a traditional injection molded product, such as alteration in sizing, design, pattern, or structure requires a new mold resulting in a costly process.

Injection molding of polyurethane or a similar thermoplastic material in the presence of a textile is used in a variety of contexts in constructing footwear. For example, injection molding of textiles has been used to bond fabric shoe uppers to an injection molded insole, to create foam-filled shoe uppers, fabric-bonded boot liners and the like. The injection molding of textiles also uses a mold manufacture style. In some embodiments, an aluminum casting may be closed and sealed around the moldable material. In the case of fabric-bonded injection molded footwear components, the mold may be lined with a textile. Foam may be injected into the fabric lined mold so that, as the foam dries, the hardenable material adopts the shape of the mold and becomes bonded to the fabric. Like conventional injection molding in the absence of a fabric layer, cleanup of molds after hardening is extensive. Additional processing methods are typically required including trimming of excess injected or fabric material, and stitching, adhering or otherwise attaching additional design elements.

The Inventors herein have recognized the above several drawbacks of traditional methods of shoe manufacture. As discussed above, the heavy reliance on solvent-based adhesives can negatively impact the quality of the environment during construction. Additionally the reliance on construction by hand and multiple methods of manufacture for varied product types complicates the manufacture process and makes uniformity in sizing difficult. Furthermore, traditional methods of injection molding and of fabric-bonded injection molding require extensive set up and cleaning of molds during manufacture. Additionally, the reliance on molds makes for a significant investment in different molds across a product line to produce elements in varied sizes and styles. Moreover, conventional methods of fabric-bonded injection molding produce components of footwear that necessitate additional structures and assembly for development into completed footwear.

Recognizing these drawbacks, the Inventors describe herein a port-injection footwear in which use of a closed mold is unnecessary. Obviation of the traditional mold is achieved by direct injection of foam, such as polyurethane, into a bag, such as a footwear-structure bag. This bag forms a substantially sealed cavity between a foot surface and the exterior to form an integrated footwear component, such as a portion of an upper. Moreover, in some examples, the bag may be directly coupled to an outsole. In some embodiments, an injection port may be adapted to receive direct injection of foam to inflate the bag. As foam fills the cavity of the bag, the bag may inflate against the attached outsole to form an article of footwear. The bag forms an integrated footwear component (e.g. one or more of a midsole, insole, sidewall and upper), protected by the attached outsole. Integration of multiple elements of footwear to form an integrated footwear component simplifies manufacture and produces a product which may be more durable and/or stable. Further, the reduction in adhesives enables footwear incorporating the direct injection method to reduce negative impacts on the quality of the environment. Reduction in adhesive use further reduces labor in shoe construction and may create a more flexible shoe structure when desired.

Port-injection footwear of the present disclosure may be adapted to a variety of types of footwear. The substantially sealed bag that retains the injected foam may be attached to many types of outsoles by a variety of attachment methods. Also, the shoe sidewalls and upper may adopt different shapes and utilities, such as that of a sandal, boot, sneaker or other type of footwear.

Thus, in summary, the inventors herein disclose port-injection footwear having a footwear-structure bag encompassing a foam core. The bag may be attached to a separately formed outsole. In one embodiment, the footwear of the present disclosure may have an integrated upper formed at least partially by a footwear-structure bag inflated by an injectable polymer. Furthermore, the footwear of the present disclosure may be formed while the bag is expanded during injection around a last or foot-shaped form. With a uniform last, regularity of sizing may be achieved. The method of the present disclosure allows for widely varied product design and finish detailing such as pattern and shape molding, which may be achieved using modular shaping tools that can be used across footwear styles and sizes and may not fully enclose nor seal onto the direct injected foam material.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 1a is a schematic illustration of port-injection footwear according to an embodiment of the disclosure.

FIG. 1b is an illustration of the port-injection footwear shown in FIG. 1a taken at cross section I of FIG. 1a.

FIG. 1c is an illustration of the port-injection footwear shown in FIG. 1a taken at cross section II of FIG. 1a FIG. 2a is an illustration of a sandal in accordance with an embodiment of the disclosure.

FIG. 7a is a cross-sectional view of a port-injection footwear article with a corrugated outsole.

FIG. 7b is a cross-sectional view of another example outsole attached by welt seam.

FIG. 7c is a cross-sectional view of another example outsole attached by stitch and turn.

FIG. 7d is a cross-sectional view of another example outsole attached by conventional stitching in accordance with an embodiment of the disclosure.

FIG. 9b is an alternate view of the footwear shown in FIG. 9a.

FIG. 10a is a foot form illustrating the location of cross sections taken in FIGS. 10b-f FIG. 10b is an illustration of port-injection footwear with attached eyelets shown at cross section I of FIG. 10a.

FIG. 10c is another illustration of an alternate example of port-injection footwear shown at cross section II of FIG. 10a.

FIG. 10d is a further illustration of an alternate example of port-injection footwear shown at cross section II of FIG. 10a.

FIG. 10e is another illustration of an alternate example of port-injection footwear shown at cross section II of FIG. 10a.

FIG. 10f is an illustration of port-injection footwear constructed with removable molds shown at cross section II of FIG. 10a.

FIG. 13a is an illustration of surface features on port-injection footwear.

FIG. 13b is a schematic cross-sectional view of formation of the surface feature illustrated in FIG. 13a.

FIG. 14b is a cross-sectional view of port-injection footwear with details made by stitching detailed in FIG. 14a.

DETAILED DESCRIPTION

Figures 2A, 2B, 2C:
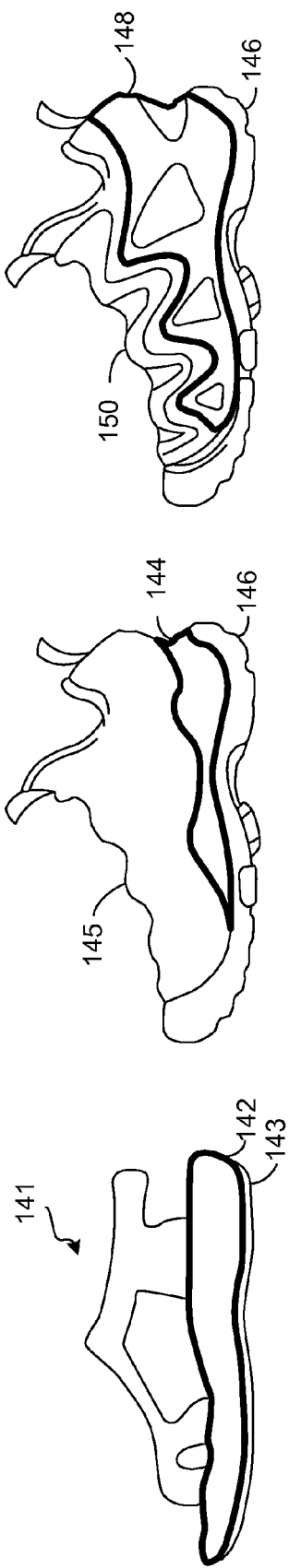
FIG. 2b is an illustration of a low boot in accordance with an embodiment of the disclosure.
FIG. 2c is an illustration of a molded sneaker in accordance with an embodiment of the disclosure.

A port-injection footwear article is disclosed herein. In one example, a footwear article is provided including a footwear-structure bag encompassing an injected foam core. The footwear article may further include a foam barrier disposed adjacent to the footwear-structure bag to retain the injected foam within the bag during injection. An outsole may be directly coupled to the footwear-structure bag forming a base of the footwear article. In some embodiments, the footwear-structure bag forms an integrated footwear component. As another example, a footwear article is further provided including a footwear-structure bag having an injection port where an injected foam is injected through the injection port and retained in the footwear-structure bag. A port cap may be positioned at the injection port of the footwear-structure bag.

Turning first to FIG. 1, FIGS. 1a-c illustrate an example of port-injection footwear 120 in accordance with the disclosure. Specifically, FIG. 1a illustrates a bottom and a side view of footwear article 120. The bottom view and side view are cut through lines I and II and cross-sectional views from lines I and II are shown in FIGS. 1b and 1c, respectively. It should be appreciated that the footwear article is provided for illustrative purposes and that the features and description are not intended to be limiting in any way.

In the illustrated figures, footwear article 120 includes a lower, shown as outsole 124. Outsole 124, also referred to as the sole of the shoe, forms a base for footwear article 120. The shape and features of outsole 124 may vary and the outsole is not intended to be limited by the disclosure.

The outsole may be formed of polyurethane, other polymers, rubbers and plastics, as well as more traditional materials such as wood, leather or cord or combinations thereof. In some examples, the outsole may be formed by traditional injection molding methods such as by injection of polyurethane into an aluminum mold by a desma machine or a similar process. It should be appreciated that the outsole may be manufactured separately from the rest of the shoe.

In the disclosed embodiment, preformed outsole 124 may be directly coupled to an upper 122 of footwear article 120. Upper, as used herein, includes, but is not limited to, the toe box, the vamp, the heel counter, the midsole, insole, etc. For purposes of this disclosure, the lower is limited only to the outsole and the immediate features of the outsole.

As described in more detail below, upper 122 may be formed, or at least partially formed, from a footwear-structure bag, indicated generally at 132. In some examples, the outsole may be directly coupled to the footwear-structure bag forming a base for the footwear article.

The footwear-structure bag 132 may form an integrated footwear component, including one or more portions or sections of the upper 122. For example, multiple shoe components, such as a sidewall and midsole, may be integrated within the footwear-structure bag to form an integrated footwear component. As such, in some embodiments, the footwear-structure bag may form a unitary body to enhance support of the footwear. This combining of multiple components further may act to lock or secure the components together. It should be appreciated that the foam and bag construction and the locking configuration may result in an enhanced durability and reduced reliance on adhesives.

Further, footwear-structure bag 132 may include a plurality of surface features described in more detail herein. Surface features may include, by way of example, windows, bands, ridges, cord, webbing, eyelets or other features. As an example, port-injection footwear 120 illustrates cutout sections or windows 128 on the sidewalls outlined by lining fabric 130. As another non-limiting example, other surface features may be integrated as part of the footwear-structure bag (and thus, the upper of the footwear article), including but not limited to eyelets 136, loop holes, ridge patterns, etc.

Continuing with FIG. 1a, for purposes of discussion, a last or foot form 126 is shown in a bold line in FIG. 1a. Construction of footwear 120 may utilize last 126 to generate a consistently-sized footwear article. Generally, and as disclosed in more detail below, the footwear-structure bag may be secured or otherwise coupled to an outsole. In one example, after coupling of the footwear-structure bag to the outsole, the footwear-structure bag, being a hollow bag structure, may be adapted to receive an injection of foam through a port injector or foam injector. The foam may expand to form a shape at least partially dictated by the design of the hollow bag structure, the upper design, the outsole and/or the foot form. As one non-limiting example, a hollow bag structure may be composed of a series of tubes that inflate to form strap-like elements. In other examples, the combination of the foot form and bag shape may control the shape. Further, in other examples, external shaping and molding tools may be used to control the bag shape and the surface features as the foam is injected and expanded in the footwear-structure bag.

It should be appreciated that the footwear-structure bag may include at least one inlet injection port or opening for receiving the injection of foam. In one example, an injection port may be sized to prevent leakage of foam during port injection and may be limited to the size of the foam injector. Thus, the injection port may be a small opening corresponding to the port injector valve tip. As the foam is injected into the footwear-structure bag, the foam expands within the bag. The footwear-structure bag may encompass or enclose the foam such that the foam or foam core is encapsulated within the bag.

A port cap, indicated schematically, at 134 may by positioned at the injection port. The port cap may operate to close the inlet injection port. In some non-limiting examples, the port cap may be sized to sufficiently cover the injection port while not extending substantially beyond the port. The port cap may be integrated within the outsole or upper and may be a visible aspect of the footwear. In other examples, the port cap may be hidden or concealed by other features of the footwear. Furthermore, in some examples, the footwear-structure bag and injection port may extend through the outsole as seen in FIG. 1a such that the cap is received in a recess or other portion of the outsole. The location of the port may vary without departing from the scope of the disclosure.

Furthermore, an article of footwear in accordance with the present disclosure may be constructed without a cap on an injection port. For example, in some embodiments the footwear structure bag may include an open injection port on or within the footwear article on any surface of the footwear article. Further, as a non-limiting example, the injection port may be configured or molded in such a way as to seal the injected foam within the footwear and as the foam hardens the injection port may become the exterior of the article of footwear.

Turning now to FIG. 1b, footwear article 120 is shown in a cross-sectional view from line I, where foot form 126 is disposed within footwear article 120. As illustrated, lining fabric 130 may be disposed adjacent to the foot form. Although shown with lining fabric extending along or adjacent the footwear-structure bag, it should be appreciated that the lining fabric is not required and that other materials or no materials may be used between the footwear-structure bag and a user's foot. Further, in some examples, the lining fabric may be integrated as part of the footwear-structure bag or may form an additional layer adjacent or in close proximity to the footwear-structure bag.

The footwear-structure bag 132 may include one or more foam barriers 133 indicated by the dashed line in FIGS. 1b and 1c. It should be appreciated, that the foam barrier and footwear-structure bag may be, in some instances, the same material, while in other embodiments the foam barrier comprises an additional layer, coating, or lining described in greater detail below. In some examples, the foam barrier 133 may be disposed on an internal facing surface, such as indicated at 135. Further, in some embodiments, the foam barrier and footwear-structure bag may form a two-layer construction, where the foam barrier is on an opposite surface of a section of the footwear-structure bag. For example, as shown in FIG. 1b, the foam barrier may be on an internal facing surface of a section of the footwear-structure bag, indicated at 135 and may be on an external or opposing surface of a second section of the bag, as indicated at 137. It should be appreciated that other configurations for the foam barrier may be used without departing from the scope of the disclosure.

Sections with a foam barrier on an internal facing surface 135 of the footwear-structure bag may couple with join sections with a foam barrier on the external facing structure 137 of the footwear bag at a seam 139. This seam may comprise a weld, stitch, or adhesive coupling. In some examples, the seam may be positioned at the injection port. In other examples, two or more seams may be used to form a complete footwear-structure bag. In some examples, the seam and/or the position of the foam barrier (and the foam structure bag material and construction) may be configured so as to release air during injection of foam such that air pockets are minimized during injection of foam in the footwear-structure bag.

As mentioned above, foam barrier 133 may operate to retain the foam 140 such as an injected foam, within the footwear-structure bag. By providing a foam barrier, during injection, the foam will be retained such that the foam does not leak from the bag. By retaining the foam within the bag, minimal finishing/cleaning steps are needed in regards to completion of the integrated footwear component.

Any suitable material or coating may be used to retain the injected foam within the bag. As such, it should be understood that the foam barrier may be a coating, lining, lamination, or other. As one, non-limiting example, the foam barrier may comprise a urethane material coating. In another example, the foam barrier may comprise a waterproof coating. It should be appreciated that a foam barrier need not be waterproof so long as it has a foam blocking capacity. Further, in some embodiments, the foam barrier may be integrated with the bag material. For example, leather may be used in the construction of the hollow bag structure and may provide its own, intrinsic, foam barrier as it is suitable to block injected foam from seeping through.

Furthermore, radiofrequency welds, expandable thread or waterproof sealants may be used on the seams of the hollow bag structure to further prevent seepage of injected foam out of the hollow bag structure.

Foam, injected in the footwear-structure bag, may be selected for its utility to a specific article of footwear which may include its thermal, durability, or permeability characteristics. Example foams, include, but are not limited to polyurethane and other expandable and hardenable thermoplastic material. Additionally, a foam's propensity to expand, its overall hardness and density, as well as the quantity of foam injected may vary and impart differing properties to a finished article of footwear. In an example, non-limiting embodiment, a polyurethane foam may be used which has a specific gravity of 0.20-0.60 $g/cm^3$ and a hardness ranging from 35-60 Asker C.

In one example, foam used as the filler within the footwear-structure bag may enhance the comfort and reduce the weight of the footwear. In other examples, the foam further may provide insulation to the footwear. Such insulation may be used to enhance cold-weather footwear and may be ventilated for warm weather footwear. Additionally, the foam may impart waterproof qualities to the footwear. In an embodiment of the present disclosure, and discussed in more detail herein, two or more bag structures within a single article of footwear may allow for different foams or fabrics to be isolated to a particular area of the foot and/or footwear to specifically exploit the varied properties of selected materials.

In the cross-sectional view of the article of footwear 120 shown in FIG. 1b cut out sections 128 are seen where foot form 126 is exposed to the environment. In this example, cut out sections 128 are bordered by inner lining fabric 130.

Inner lining fabric 130 may directly contact the foot form 126 and may be attached to the foot-facing surface of bag structure 132. In some example, this inner lining fabric may be selected for performance features such as wicking or insulating properties. The lining fabric may also serve an aesthetic purpose, for example creating a contrast color border to cut out section 128.

It should be understood that an article of footwear of the present disclosure need not contain cutout sections, nor lining fabric and may be constructed as a solid shoe, boot, sandal, or another form of footwear. Furthermore, the bag structure may be configured to directly engage a user's foot without necessity of a lining fabric, though one may be used as desired for aesthetic or performance reasons.

As viewed in FIGS. 1a-c, footwear-structure bag 132 with foam barrier 133 forms a cavity that may be injected with foam to create a "body" of a footwear article. The body may extend below the foot and/or along the upper as in the cross-sectional views shown in FIG. 2b and FIG. 2c. The width of the body may be controlled by the sizing of the bag structure, the amount of foam material, and shaping of the bag structure.

In some examples, the sizing of the body may further be controlled by the material used in construction of the footwear-structure bag. The bag may be composed of a textile material, and in some embodiments, the bag material may have a select stretch level. For example, in some embodiments, a material with a high stretch property may elongate as the foam expands. Such elongation may be selected for some portions of the footwear article that are desired to expand. Further, such high stretch properties may be desired if a portion of the footwear article is to expand up against an external form to pick up shape, texture and detail of the external form. In other embodiments, a low stretch property material may be used to prevent the foam from flowing into other areas of the shoe. In many embodiments, the footwear-structure bag, also referred to herein as a shell, may have a combination of materials, each with a select stretch property. Thus, a first section of an example footwear-structure bag may have a first stretch property while a second section has a second different more elastic or stretch property. Furthermore, materials used may comprise knitted, woven, nonwoven, and leather as non-limiting examples.

Turning now to FIGS. 2a-e, a series of illustrations are provided showing the use of a footwear-structure bag, or shell to create various footwear articles. The various articles of footwear are shown with the segment forming the hollow bag structure shown in bold.

As a first example, a sandal 141 may include a bottom unit 142. The hollow bag structure may be integrated as bottom unit 142 directly coupled to outsole 143. In this example, bottom unit 142 is constructed of a bag structure filled with injected foam forming the midsole and insole of the article of footwear. The sandal straps and other portions of the sandal upper 141 may be attached to the footwear-structure bag. Foam may be retained in the footwear-structure bag.

In another embodiment, shown in FIG. 2b, the footwear-structure bag may be used, for example, to create a low sidewall 144 (outlined in bold). The article of footwear further comprises additional upper features 145 which may be attached to the footwear-structure bag forming low sidewall 144. Outsole 146 may be attached at the base of the port-injection footwear.

In FIG. 2c, another example of port-injection footwear is illustrated with a footwear-structure bag, outlined in bold, forming a high sidewall 148. Additional non foam-filled upper features 150 may be coupled or otherwise attached to the footwear-structure bag. Outsole 146 may be directly coupled to the footwear-structure bag.

Figure 2E:
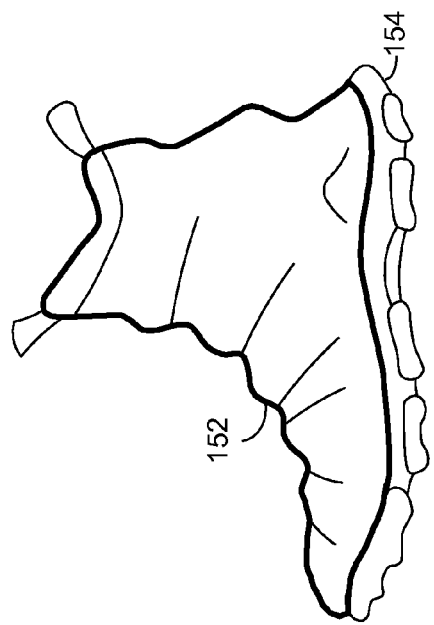
FIG. 2e is an illustration of a boot in accordance with an embodiment of the disclosure.
Figure 2D:
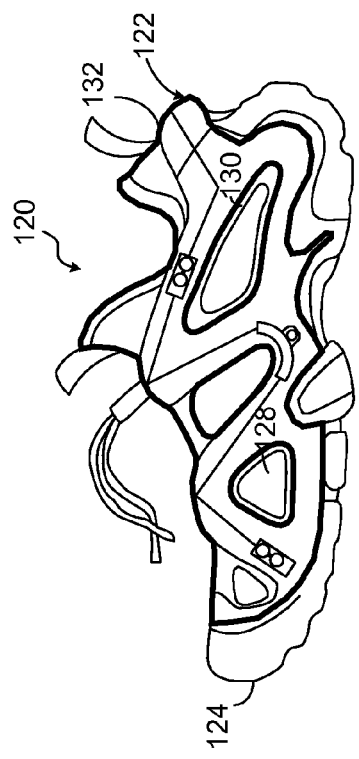
FIG. 2d is an illustration of a molded sneaker with cut out sections in accordance with an embodiment of the disclosure.

FIG. 2d shows another example of incorporation of footwear-structure bag 132. As detail in FIG. 1a-c, footwear 120 utilizes a hollow bag structure 132 which contains cutout sections 128. These cutout sections may be bordered by lining fabric 130. This example of port-injection footwear displays the versatility in structure of the hollow bag structure 132. The hollow bag structure may adopt many shapes to provide support and form an integrated footwear component.

As a further illustration of the versatility of the use of the footwear-structure bag, shown in FIG. 2e is an example of port-injection footwear in the form of a boot. As shown the footwear-structure bag may extend and form the entire boot upper 152. The footwear-structure bag may be further attached to outsole 154.

The port injected footwear of the present disclosure can furthermore be adapted to construction of specialized footwear such as hockey skates, ski boots, work shoes, or boot liners in addition to casual or sports footwear such as sandals, sneakers and boots.

Figure 3:
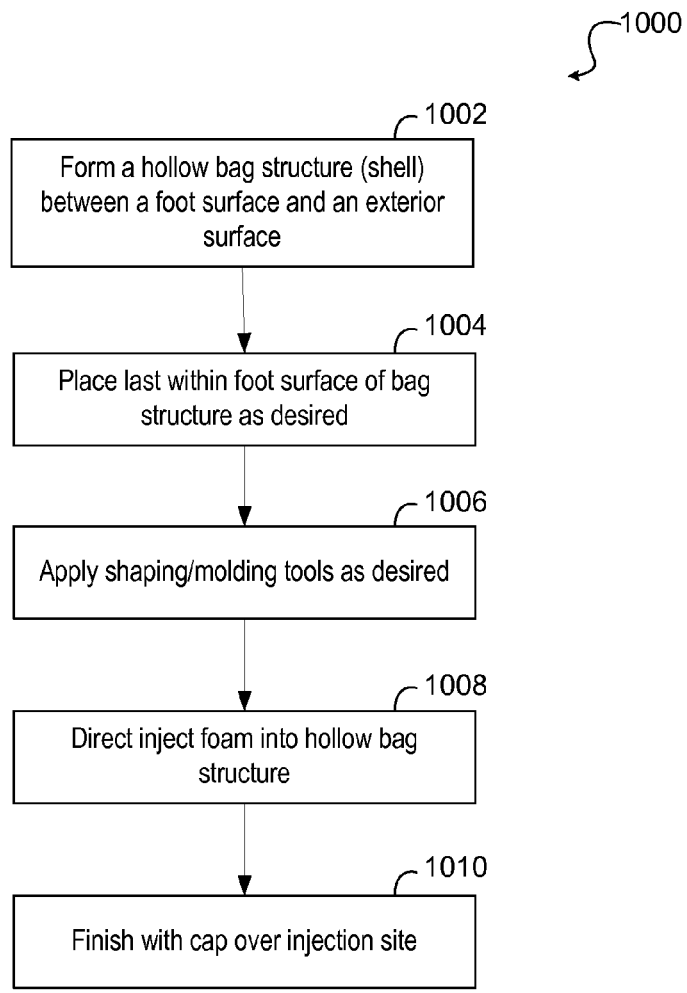
FIG. 3 illustrates an example process flow of a method of making port-injection footwear in accordance with an embodiment of the disclosure.

Turning now to FIG. 3, a process flow 1000 of an example embodiment for forming a port-injection footwear article is provided. As shown at 1002, a hollow bag structure (also referred to herein as a shell) is formed between a foot surface and an exterior surface. As discussed above, the hollow bag structure or footwear-structure bag may be adapted to create a suitable shape for a selected type of footwear and footwear design.

A foot form or last may be used to provide the internal shaping. In one example, the foot form may be placed within the foot-facing surface of the hollow bag structure during injection of foam at 1004. The foot form may impart qualities into a finished article of footwear such as shaping or sizing of the foot-facing surface of an article of port injected footwear. For example, because the footwear of the present disclosure may be injected with foam that expands to take a shape imposed on it by the hollow bag structure and molds, utilizing identical lasts or foot forms may create footwear with superior consistency in sizing.

In addition to the last, at 1006, shaping and molding tools may be applied to the exterior of the footwear-structure bag prior or during port or foam injection. These molds, bands, strapping or other shaping tools provide an area of compression for the foam to expand against as the foam fills the hollow bag structure. This shaping may serve to increase performance features of the footwear, minimize weight and/or increase flexibility. Furthermore, as another example, the shaping may be used for aesthetic purposes and may include patterns, textures or bands.

The hollow bag is then direct injected or port injected with foam at 1008. The foam is injected through one or more inlet injection ports or valves in the bag. The foam injector, also referred to as a port injector, is positioned to release foam into the bag. In some embodiments, valve tips may be used to extend the port injector further into the bag or the injection port of the bag.

The port injector may be an injector from a direct inject polyurethane machine. Foam, such as polyurethane, is injected into the hollow bag structure to inflate the shell and form a footwear article. In an alternate embodiment the shell of the port-injection footwear may contain several isolated bag structures each with a foam barrier separated by seaming, welds, adhesives or another method through which injected foam may not permeate. These different hollow bag sections may adopt many variations as far as orientation, composition and fill, of which examples are further discussed below herein.

An outsole may be directly attached to the hollow bag structure prior to injecting foam to provide a base structure for the foam to expand against. In some examples, a bottom plate may also be used to support the outsole during inflation of the hollow bag structure. The bottom plate may be a cradle to support the inflating structure. The bottom plate may be configured to control the tread (heel versus forefoot thickness) and the flatness of the surface that contact the ground. The bottom plate can be shaped to accommodate the complexity of the design.

As discussed above in regards to FIGS. 1a-c, the footwear-structure bag may include a foam barrier such that injection of foam material into the hollow bag causes retention of foam and expansion of the bag. Furthermore, in some embodiments, the port-injection footwear may be constructed of more than one hollow bag, where each bag may be filled with foam (of the same or differing qualities) through their own inlet injection ports and port injector. In other embodiments, and as another example, a single hollow bag structure may contain multiple fill or injection ports.

In the case where a last and/or shaping tools are used, during expansion of the injected foam, the footwear-structure bag may adopt the shape of the inner foot form and exterior design tools.

Through this method, the footwear-structure bag may form an integrated footwear component, including one or more portions of the upper of the footwear. As a non-limiting example, structural elements of port-injection footwear may be used to enhance lateral support. Specifically, an integrated sidewall insole and midsole may enhance lateral support. In other embodiments, the integrated footwear component may form other portions of the upper. For example, sidewalls, insole and midsole may all be integrated into the injected foam portion within the footwear-structure bag of the footwear article.

In some embodiments, a port cap may be disposed to cover the inlet injection port or ports. For example, in the method flow chart of FIG. 3, the footwear may be finished with a cap over the injection site, at 1010. Additional finishing steps may be applied depending on the footwear design. It should be appreciated that the method of the present disclosure simplifies the construction and finishing of footwear when compared to traditional methods of footwear manufacture that require many additional assembly steps and extensive clean up of equipment.

Molding of an article of footwear in accordance with an embodiment of the present disclosure may make the footwear suitable for adaptation to a variety of performance or fit features. For example, molding around a last allows for adaptation of shoe fit beyond just size and width, and may be used to create an article of footwear with precise fit and support in foot areas such as the instep, arch or ankles. Further, an article of footwear created in accordance with the present disclosure may include performance benefits such as internal vent channels or waterproof, seamless construction. Additionally, the quality of molding may be improved compared to traditional injection molding methods as the injected foam is not exposed to a mold, but rather contained within the hollow bag structure and thus may not be susceptible to flashing.

As described and illustrated in regards to the embodiments below, the disclosed method enables the inside of the footwear to be finished and contoured to match a desired foot shape or to include additional functional or stylistic elements. It is further possible to expand the foam within the hollow bag structure around a customized last thus creating a personalized article of footwear with precise fit. Further, the footwear-structure bag may be positioned fully around a foot form, providing full angle (360 degree) protection.

Turning now to FIGS. 4*a-d*, depending on the design of the port-injection footwear, one or more injection ports and/or one or more footwear-structure bags may be used. For example, tall boot type articles may benefit from multiple injection ports. In some examples, different types of foam may be applied through the multiple injection ports depending on the quality characteristic desired.

As a non-limiting example, FIGS. 4*a-d* show a number of alternative embodiments to illustrate the use of multiple injection ports. It should be appreciated that multiple ports may be filled independently or concurrently. Further, multiple ports may be used to provide specific local properties within the structure or to facilitate the flow of material throughout the structure. Further, multiple ports in the same footwear-structure bag or bag segment may ensure that each part is filled fully. Conversely, each hollow bag segment may contain its own port. Examples in FIGS. 4*a-d* are shown with two hollow bag segments but it should be understood that an article of footwear may contain greater, or fewer hollow bag or footwear-structure bag segments.

Figure 4A:
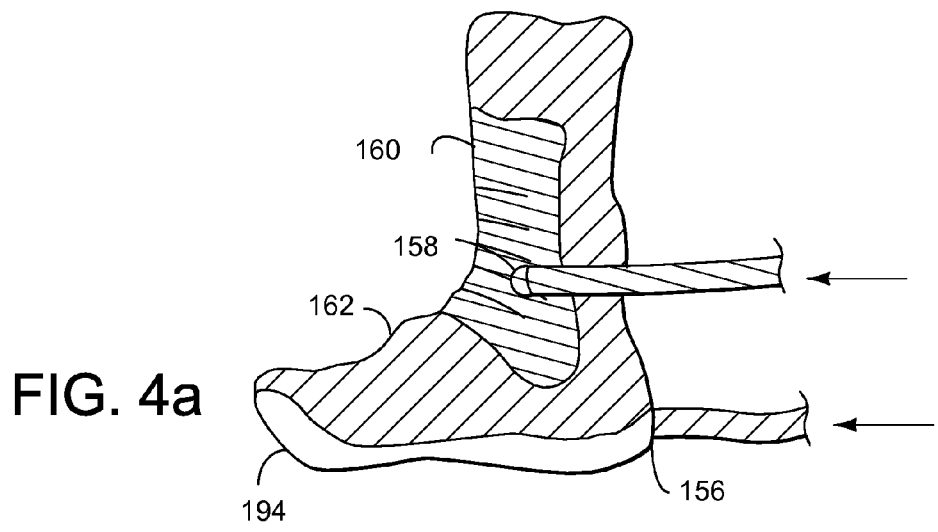
FIG. 4a is a schematic illustration of an example boot showing a plurality of footwear-structure bags.

FIG. 4*a* shows an example boot with two injection ports at 156 and 158. In this embodiment, the front footwear-structure bag 160 is filed by injection port 158. The front footwear-structure bag 160 may abuts the instep footwear-structure bag 162 filled by injection port 156. Different foams of varying density may be injected in the two bags to increase the thermal properties, support properties, and waterproof properties of the two sections.

Figure 4B:
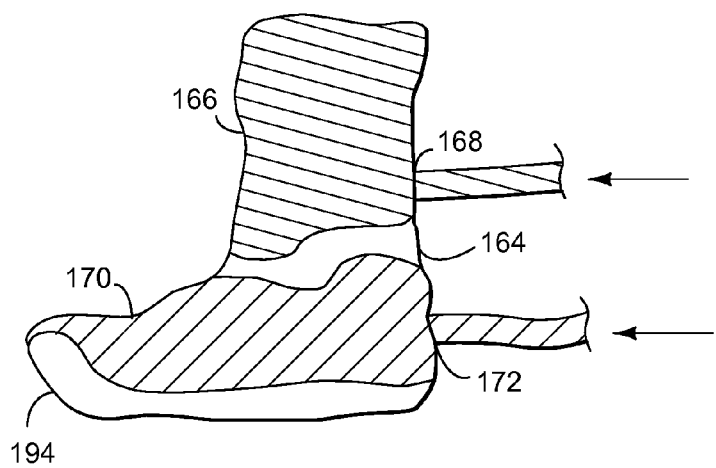
FIG. 4b is a schematic illustration of another example boot showing a plurality of footwear-structure bags.

Likewise, in FIG. 4*b*, two footwear-structure bags are shown in a single boot. An unfilled portion 164 separates an upper section 166 from a lower section 170. The upper section includes a footwear-structure bag filled at injection port 168. The lower section includes a footwear-structure bag filled at injection port 172. The unfilled portion 164 may impart a specific property to a region of an article of port-injection footwear. For example, the unfilled portion may comprise a flexible material to enable flex in a desired zone or region of the footwear. In other examples, the unfilled portion may provide, for example, additional rigidity, flexibility, insulating properties, protection properties.

Figure 4C:
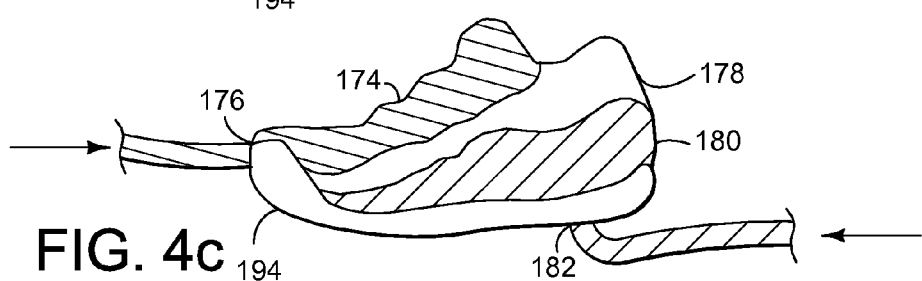
FIG. 4c is a schematic illustration of an example sneaker showing a plurality of footwear-structure bags.

Similar to FIG. 4*b*, the shoe shown in FIG. 4*c* has an instep footwear-structure bag 174 separated from a sidewall footwear-structure bag 180 by an unfilled segment 178. The instep footwear-structure bag is filled by injection port 176. The footwear-structure bag is filled by injection port 182. As discussed above, different foams may be utilized in this construction.

Figure 4D:
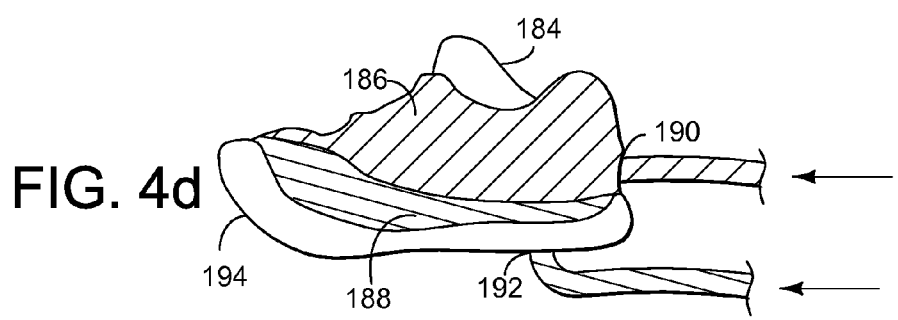
FIG. 4d is a schematic illustration of another example sneaker showing a plurality of footwear-structure bags.

As another example, FIG. 4*d*, shows a footwear article including a footwear-structure bag at 186 and a second footwear-structure bag at 188. In some examples the two bags may be coupled together. A non-filled region 184 may be adjacent the foam-filled portions. For example, unfilled portion 184 is on top of the abutting foam filled footwear-structure bag 186 and footwear-structure bag 188, filled by injection ports 190 and 192 respectively. As a non-limiting example, unfilled portion 184 may be configured to provide a tongue, collar or other similar structure.

The varying locations and orientations of separate foam-filled bag structures allow for broad versatility of shoe design and features. As noted above and as non-limiting examples, unfilled portions of the footwear article may comprise different fabrics that have more flexibility, wicking properties, aesthetic qualities, breathability, etc. Additionally, segregated fill areas may allow for use of different types of foam filler with different weights, densities, thermal properties, flexibility, etc.

Thus, as a further example, it should be appreciated, that a footwear article is provided having a first footwear-structure bag with a foam barrier disposed at least partially on an internal-facing surface of the first footwear-structure bag and forming a portion of an upper. A first foam core may be encapsulated within the first footwear-structure bag. Further, in some examples, a cap may be disposed in a position to cover a port in the first footwear-structure bag. The footwear article may further include a second footwear-structure bag forming a second portion of the upper. In some embodiments, the second footwear-structure bag may encapsulate a second foam core where the second foam core is a different material than the first foam core. Although described in regards to two footwear-structure bags and cores, any number of bags may be utilized with same or different foam cores.

In addition to differences in material injections, injection ports may also vary in their location as seen in FIGS. 4*a-d*. Injection ports may enter through an outsole 194 at varied locations such as through toe cap injection port 176, under a sole injection port 182 and 192, or a heel injection port 156. Furthermore, injection ports need not enter through the outsole 194, but may be located on the shoe upper such as instep injection port 158, ankle injection port 172 and upper heel injection port 190. This flexibility in injection port location lends further variety to footwear design capabilities and can accommodate a wide variety of shoe styles and can be configured to allow optimal foam filling for a desired footwear style.

Figure 5A:
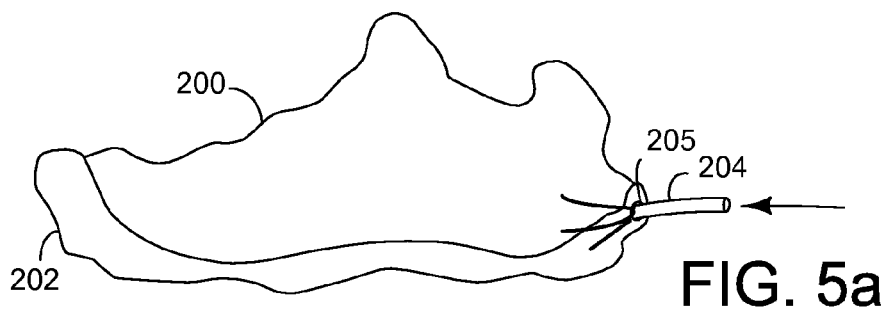
FIG. 5a is a schematic illustration of a method of injecting foam into a footwear-structure bag at an injection port.
Figure 5B:
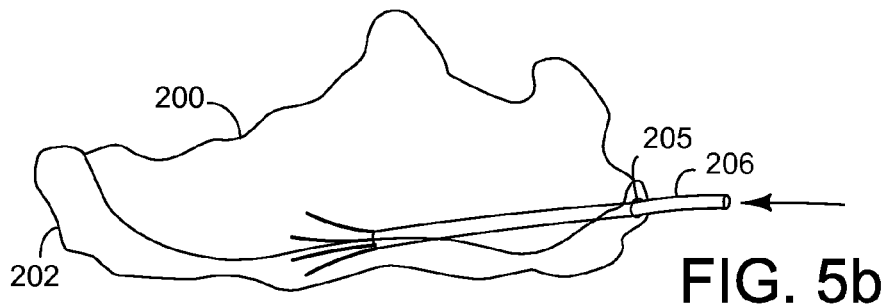
FIG. 5b is another schematic illustration of a method of injecting foam into a footwear-structure bag at an injection port.
Figure 5C:
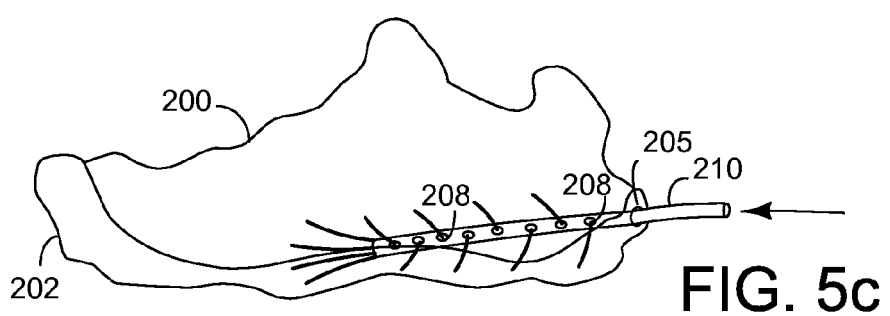
FIG. 5c is another schematic illustration of a method of injecting foam into a footwear-structure bag with permeable tubing inserted into the bag through an injection port.

FIGS. 5*a-c* provide further examples of schematic illustrations of injection configurations. Specifically, within the footwear-structure bag 200, an injection nozzle with an extension or flow tube or valve tip may be used to distribute material throughout the shell. The flow tube may deposit material into hollow bag structure 200 at the terminal end of outsole 202 such as flow tube 204 shown in FIG. 5*a*.

In another example, a flow tube may extend beyond the injection port and into footwear-structure bag 200 to deposit material more centrally into an article of footwear. In this regard, a schematic illustration of an extended flow tube 206 is shown in FIG. 5*b*.

As a further example, at FIG. 5c, a flow tube may contain outlets or openings 208 to distribute material into footwear-structure bag 200. In such a configuration, foam may be injected into the bag along the length of the perforated flow tube 210.

It should be appreciated that in some examples, the extension tube may be removed from the footwear after injection. In other examples, the extension tube may remain in the footwear after injection. In other embodiments, the extension tube may be adapted to remain in the shoe and provide structural or cushioning support.

As briefly mentioned above, the injection ports may be disposed in any suitable position in the footwear-structure bag. In some embodiments, the injection ports may be at the heel of the footwear such that the footwear-structure bag is oriented with the injection port aligned with an outsole opening. In other embodiments, injection ports may be positioned at the toe, medial, lateral, or bottom position of the footwear-structure bag to address performance and processing issues.

Figure 6:
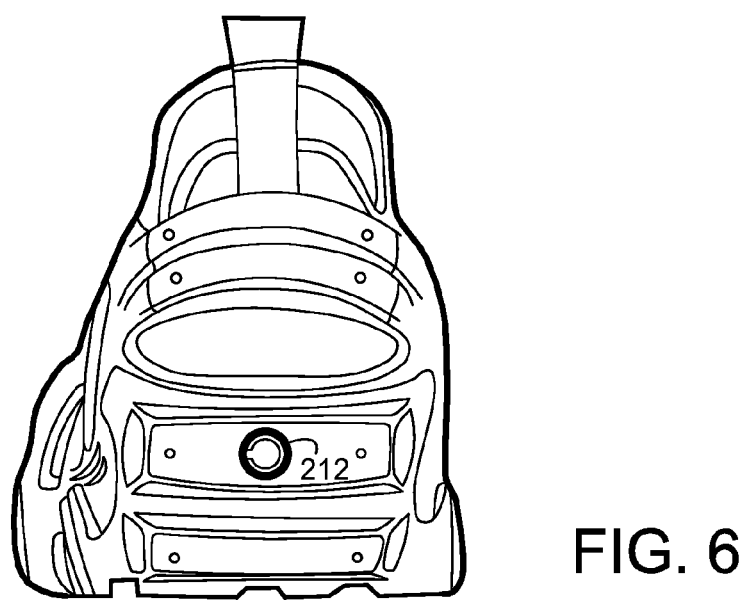
FIG. 6 is an illustration of a shoe made by a method of the present disclosure with a capped injection port.

As discussed above, a port cap or other capping or closing structure may be positioned or disposed at an injection port. FIG. 6 illustrates a port cap 212 covering an injection port. The port cap may be applied after the foam has expanded and hardened and may merge into the design of the footwear article or may be a branding indicator. In other embodiments, the injection port may be recessed or otherwise hidden to reduce its visibility to a consumer. Although shown as extending through to an external surface, in some examples, the injection port and cap may be on a foot facing surface or otherwise disposed under another footwear feature.

Additional schematic illustrations are provided in FIGS. 7a-d of the port-injection footwear. In these non-limiting examples, outsoles are directly attached to the footwear-structure bag. As a first example, in FIG. 7a, a corrugated outsole 240 is shown with ridges on both the ground facing surface and the midsole facing surface. An outsole of this design may offer improved flexibility or weight savings. Port-injection footwear of the present disclosure may be adapted to the use of an outsole with a midsole facing texture as shown in FIG. 7a. For example, the textile of the footwear-structure bag 242 may be attached to the outsole by a number of adhesives. Injected foam 244 and footwear-structure bag 242 may adopt the shape of the inner surface of the outsole forming an integrated footwear component.

In some examples, a controlled or reduced amount of adhesives may be used in the footwear (in comparison to conventional methods), where the adhesive may be used to attach footwear-structure bag to a separately formed outsole with any variety of midsole facing surface structures, or a smooth surface. Adhesive bonding of the outsole may be further used in conjunction with any other additional attachment method, some of which are provided below as examples.

Specifically, in regards to FIG. 7b, an example outsole attachment method is shown using a welt seam. In this particular embodiment, an outsole 248 may be attached to footwear-structure bag 250 utilizing a standard inner seam 252 and an outer welt seam 246.

In the example shown in FIG. 7b the two sides of the footwear are shown with different seaming. It is further possible to use similar seaming on both sides of the article of footwear and the seaming may depend on the application and design of the footwear.

An additional example outsole attachment is shown in FIG. 7c. In this example, a partial outsole 252 is attached to an exterior facing portion of a footwear-structure bag 254 by a stitch and turn method. In this example, an upward facing turn of the partial outsole 252 is attached to the hollow bag structure by stitching 256.

In some examples, the stitch and turn construction may impart stability and durability to the port-injection footwear. Furthermore, stitch and turn construction may be used to incorporate elements other than the outsole to the footwear-structure bag.

Further illustrated in FIG. 7c are sidewall scuff guards 258. Sidewall scuff guards are adhered to the exterior face of footwear-structure bag 254 at the juncture of the partial outsole 252. This embodiment may allow for further shaping and tooling of the integrated sidewall. Additionally, the method may ease altering shoe design aesthetics across model types by utilizing an identical partial outsole with varied sidewall scuff guards.

As another example, in FIG. 7d, a footwear-structure bag 262 is shown with standard stitching 264 attaching outsole 266 at both sides of the cross section. Such stitching may be used in combinations of various attachments methods without departing from the scope of the disclosure.

It should be appreciated that in each embodiment, the footwear-structure bag is directly attached to the outsole. Although direct attachment is illustrated, in some embodiments, additional layering or other features may be disposed between the outsole and the footwear-structure bag without departing from the scope of the disclosure. Additional intermediary elements may be present between the hollow bag structure and outsole such as an adhesive layer or additional midsole type layer for example. It should further be appreciated that the foam itself does not directly bond to the outsole. Rather, the injected foam is retained in the footwear-structure bag and the outsole is attached to the exterior facing surface of the footwear-structure bag. This feature of the footwear-structure bag wholly surrounding and retaining the injected foam allows for ease of finishing and modular shaping or molding of an article of footwear in accordance with the present disclosure.

Figure 8A:
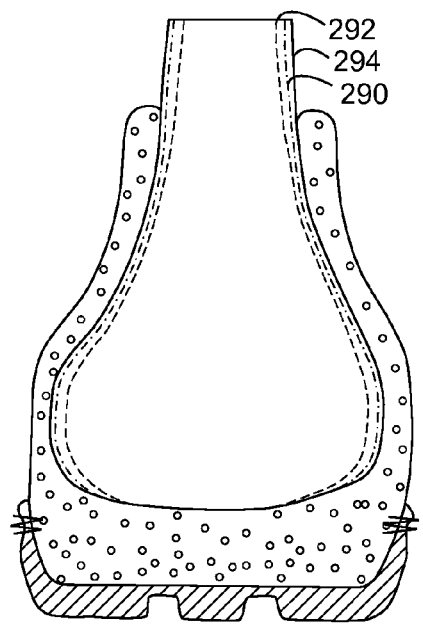
FIG. 8a is a cross-sectional view of examples of different last widths for construction of port-injection footwear.

The foot-facing surface of the port-injection footwear of the present disclosure may also be easily modified or customized as desired. FIG. 8a shows an illustrated example of an article of footwear that may be molded around lasts of different widths. Standard last 290 may be replaced by narrow last 292 or wide last 294. This difference in footwear article width may be achieved without altering additional footwear components and without using separate molds which may simplify production of shoes of the same size with varied widths.

As another example, it may be desired to accommodate a change in desired width, the bottom or outsole may be configured to expand or allow expansion to match the last providing an underfoot platform that supports the width of the foot form. In some embodiments, the sizing may be an automatic process as a result of the expanding foam. In an alternate embodiment, the outsole may be physically expanded prior to the injection of the foam material.

In addition to shaping the upper, for any given external shape, the last or internal form may be modified to accommodate multiple sizes. For example, one set-up or configuration may accommodate a size 7, size 7.5 and a size 8. The exterior dimensions of the shoe may be consistent (e.g. a size 8) whereas the inside shape may reflect the last or foot form. Further, in some embodiments, further custom configurations may be changed without requiring any additional or unique tooling. For example, beyond size, the foot shape may be changed to reflect a high arch, a low arch, a narrow foot, a wide foot, etc. Such modification of the last without additional or unique tooling is in contrast to conventional injection molded footwear where each sizing variation requires a different mold as utilizing a non-matched last could result in the material flashing.

Figure 8B:
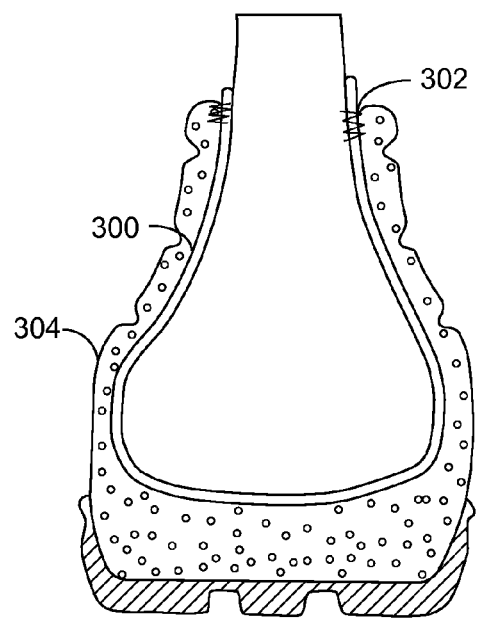
FIG. 8b is a cross-sectional view of another example of port-injection footwear with an interior lining.

In FIG. 8*b*, an illustration of an article of footwear is shown wherein an inner liner 300 is attached by stitching 302 to the foot facing surface of the footwear-structure bag 304. This liner may be selected for a number of qualities including its thermal properties, wicking, breathability, feel, or aesthetics. In this particular example, a liner is shown attached by stitching to the top of a shoe structure, but in other embodiments, the liner may be glued, welded or otherwise attached. Likewise, a liner stitched to the hollow bag structure could be stitched in any manner or location to connect to the hollow bag structure. The liner may be of one or more select materials to meet the desired characteristics of the footwear. Although a single liner is shown, additional layers may be applied to the inside-facing surface of the footwear-structure bag or outside-facing surface of the footwear-structure bag.

Figure 9A:
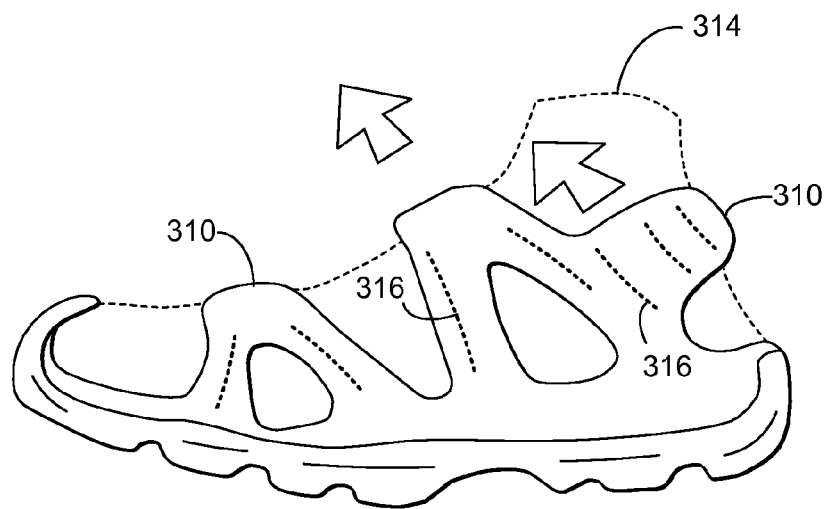
FIG. 9a is a schematic illustration of port-injection footwear with interior surface channels.
Figure 9B:
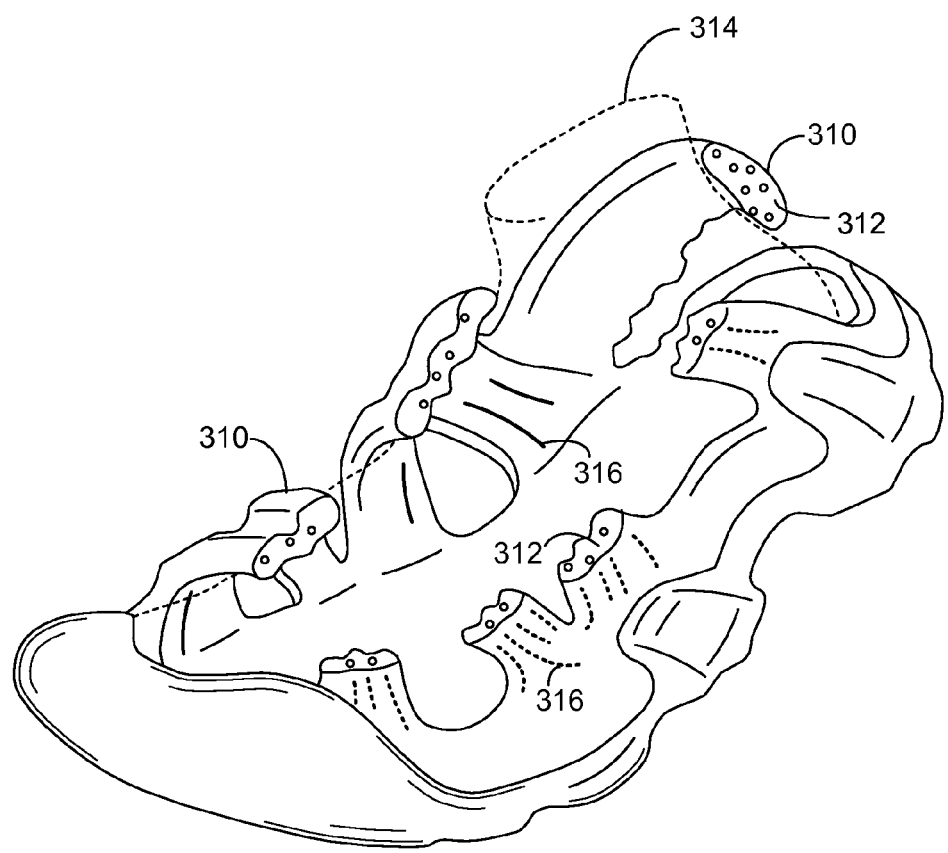

As another embodiment, FIGS. 9*a* and 9*b* show two views of example port-injection footwear with foot-facing channels imparted by a modified last. Specifically, in FIG. 9*a*, channels 316 (shown in dashed line) are formed on the foot facing surface of the hollow bag structure 310. The channels may be suitable to conduct air (indicated by the arrows) away from the foot surface to ventilate a user's foot. In formation of channels 316, a molded last 314 may be formed with molded grooves on its surface to impart the channel structures 316 to the foot facing surface of the footwear-structure bag as injected foam dries in the presence of molded last 314.

A second view of the port-injection footwear with channels 316 is shown at FIG. 9*b*. In this view, the footwear-structure bag 310 is shown in cut away, channels 316 can be seen on the foot facing surface of footwear. As the foam hardens, injected foam 312 and the footwear-structure bag adopt the shape of the modified last 314 to form ridges or channels 316.

In the above examples, the channels may be configured to conduct heat away from a user's foot. Specifically, FIGS. 9*a* and 9*b* show an example article of footwear where the last is used to form molded design elements on the foot-facing surface for the purpose of cooling. In other examples, foot-facing molded elements may be designed for other purposes. For example, foot-facing molded elements may include features to drain water away from a foot surface, features to reduce weight of the footwear, features to improve flexibility of a shoe upper, etc.

Similar to the formation of foot-facing features, similar and alternate methods, molding and/or other detailing may be applied to the exterior surface of port-injected footwear. Example exterior surface features are described in FIGS. 10*a-f* and such exterior surface feature may be applied for aesthetic, design or performance purposes. It should be appreciated that the foot-facing features and the exterior features are considered surface features. These surface features may be formed in or coupled to the footwear-structure bag.

Turning first to FIG. 10*a*, FIG. 10*a* shows an example last or foot form 320 illustrating the location of cross sections I and II taken in depicting example detailing methods shown in FIGS. 10*b-f*.

FIG. 10*b* provides a cross-sectional view taken at a position line I of last 320. In this example embodiment, the footwear includes a footwear-structure bag 322. The bag 322 does not extend (at this position) over the entire last. At the topmost surface of footwear-structure bag 322 eyelets 324 are shown attached by stitching 326. Such eyelets may be used as anchor points for webbing, laces or other elements providing structure and closure to an article of footwear of the present embodiment.

Referring now to FIG. 10*c-f*, examples articles of footwear with exterior facing ridges are shown at a position line II of last 320 in FIG. 10*a*. Specifically, in FIG. 10*c* ridges 328 result from expansion of a flexible fabric wrapped or secured around footwear-structure bag during injection and expansion of the foam. The restraint from the fabric or other structure is shown, for example, at 332. Footwear-structure bag may expand in sections not constrained by the flexible fabric forming ridges 328.

It should be appreciated that ridge elements may be formed by plastic, rubber, non-stretch textile, or other materials. Furthermore, elements incorporated into the footwear-structure bag may be used in any location or orientation to impart design features to an article of port-injection footwear.

As another example, FIG. 10*d* illustrates an alternate method of constructing a similar, ridged, profile on the exterior facing surface of an article of footwear. In this example, strictures in the external profile are made by stitching 336 in the footwear-structure bag 340. Such stitching generally may be applied to the footwear-structure bag prior to foam injection, however in other embodiments, the stitching may be post foam injection.

As shown in FIGS. 10*e* and 10*f* removable external structures, such as bands 342 in FIG. 10*e* and molds 344 in FIG. 10*f* may be employed to produce shaping features on an external surface of an article of footwear. As discussed above, the footwear-structure bag adapts to the surface that it forms against during the expansion of the injected foam such that finish details, including texture and other features may be incorporated into the finished footwear article.

Furthermore, FIG. 10*f* shows the use of a bottom plate 346. For example, the bottom plate may be used as a base for attaching removable molds as well as to dictate the thickness of a midsole created by the injected foam by virtue of the distance between a bottom plate and a last as foam is injected into the footwear-structure bag. In another, non-limiting example, a bottom plate may be used to provide a tread pattern to the bottom of a footwear-structure bag prior to, or in the place of, attachment of a separate outsole.

In some examples, removable molds such as those shown in FIG. 10*f* may be a soft composite shape block. The soft composite shape block, or blocks, provide an area for the footwear-structure bag to expand against as it is injected with foam. The soft composite shape block may be used in conjunction with welds or stitching as in FIG. 10*d*. In such an example, the footwear-structure bag may expand against the soft composite shape block in regions where it is not restricted by stitching, welding or other constrictions. Furthermore, additional molding elements may be attached to a soft composite shape block. The additional pieces may provide detailing or patterning. Further, in some examples, such molding elements may comprise a different, possibly more rigid, material than the soft composite shape block. Further, in some examples, such molding elements may be removable from the soft composite shape block.

In some examples, it may be desired to provide shape constraint along a substantial portion of the structure. In such examples, soft tooling may be placed within the frame to control the shape. For example, removable shaping tools may include, but are not limited to, straps, belts, clamps or other methods to restrict expansion of injected foam as it fills the hollow bag structure. In contrast to traditional aluminum tooling, as disclosed herein, the foam is contained within the structured bag and the soft tooling does not need to "seal" against any surface to prevent the foam from flashing onto the exterior of the upper.

It should be appreciated that the shaping tools used with the footwear-structure bag may be easily removed, shared and switched amongst various footwear articles as well as utilized for construction of shoes of many sizes. The ease of use of the shaping tools is a result of avoiding direct contact with the injected foam in that the tools contact the exterior surface of the footwear-structure bag instead of the foam itself. Additionally, because the injected foam is contained by the footwear-structure bag, shaping tools including straps, molds, and bands do not need to encompass the entire footwear surface and can be utilized in a specific region. Likewise, due to the modular nature of the shaping tools, such tools may be readily altered in configuration, easing alteration of design elements in subsequent footwear articles.

Additional exterior features may be formed in the footwear-structure bag. In FIGS. 11-13, local area designs are shown. For example, striping, sidewall lines, logo stamps, etc. may be formed using local area shape tools. In some examples, a small shape tool may be used to act as a local pinch point against the foam as it expands.

Figures 11A, 11B, 11C:
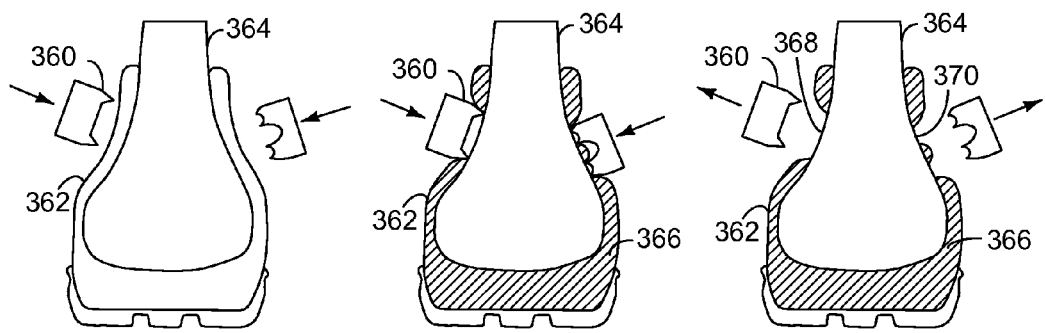
FIG. 11a is a schematic cross-sectional view of an example port-injection footwear imprinted with removable molds.
FIG. 11b is a schematic cross-sectional view of an example port-injection footwear imprinted with removable molds during injection.
FIG. 11c is a schematic cross-sectional view of an example port-injection footwear molded by removable molds.

In the illustrations of FIGS. 11a-c, soft tooling to target a specific region or portion of the upper is provided. The tooling provides desired design features and controls the inflated shape of the footwear-structure bag. For example, soft tooling elements may be attached to the upper so as to constrain or shape the upper in specific locations. Shape tooling may be used to fully compress the footwear-structure bag such that no injected foam can fill a "no-fill" region of the bag.

In FIG. 11a, example shaping tools 360 are shown being introduced to footwear-structure bag 362 prior to injection of foam material. In FIG. 11b, the shaping tools 360 are pressed firmly against last 364 to compress footwear-structure bag 362 such that no injected foam 366 can fill the footwear-structure bag in the confined or "no-fill" areas. As shaping tools are removed, as shown in FIG. 11c, the hardened injected foam forms surface features, including an elongated shape 368 and compressed ridges 370.

In other examples, shape components may be used to sandwich the footwear-structure bag to restrict the flow and expansion of the foam. The shape components may be secured to the form in a variety of ways, including, but not limited to, magnetic coupling, cam locks, screws, pins, etc. As an example, the external elements may be secured to the upper, secured to the last (or internal form) or positioned around the lasted upper.

Following injection, the external element may be removed from the shell, and in some embodiments, reused. As such, the external elements may be considered, in some embodiments, as soft tooling. However, in other embodiments, the external element or a portion of the external elements may remain with the product being either permanently attached or removable by the consumer.

It is noted that in some embodiments, the entire finished surface of the shoe may be molded to a predefined shape using the soft tooling and/or molds described above. However, in some examples, the bag structure provides a natural expansion such that unique curvature may be introduced to the article of footwear. Such expansion may provide a desired unique and identifiable aesthetic.

Figures 12A, 12B:
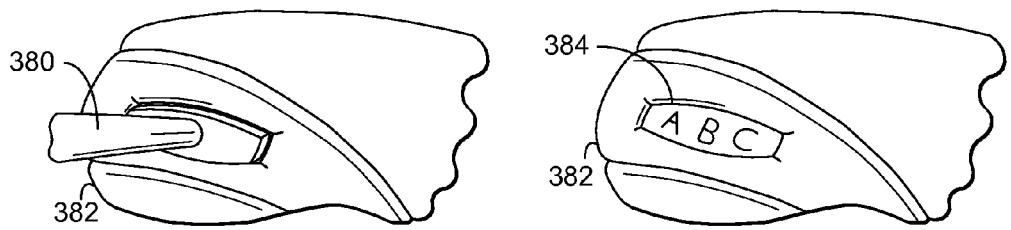
FIG. 12a shows a method of producing surface features on the port-injection footwear.
FIG. 12b shows an example of surface features on port-injection footwear.

Moving to FIG. 12, another example of a shape tooling is shown in FIG. 12a where a patterned tool 380 is pressed against the footwear-structure bag 382 as foam is injected and allowed to expand against patterned tool 380. Once the foam hardens and patterned tool 380 is removed an imprint 384 of a logo, text, design, texture, brand, etc. may be disposed on the surface (as shown in FIG. 12b).

Figures 13A, 13B:
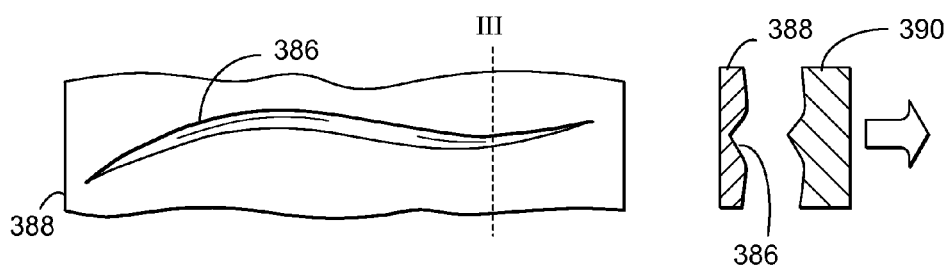

Similarly, as another example, exterior feature 386 of FIG. 13a may be imprinted or pressed into footwear-structure bag prior to the injected foam hardening. Viewed at cross section II from FIG. 13a, in FIG. 13b, the imprinted design element 386 is shown after foam injection into footwear-structure bag 388 where the foam and the footwear-structure bag have adopted the shape of removable mold 390.

As discussed above, it should be appreciated that the shape tooling for the exterior features may easily swapped and changed enabling creation of a unique aesthetic for the footwear article which may not require manufacture of a wholly different mold. Furthermore, modular shape tooling forms may be utilized on many sizes of footwear article such that differing molds for each size may not be necessary, reducing costs and simplifying manufacture.

Figure 14A:
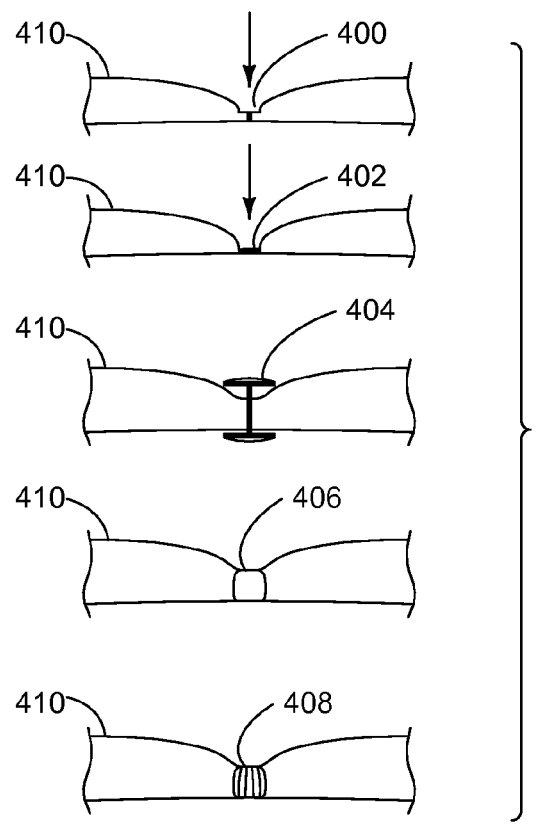
FIG. 14a illustrates examples methods for introducing a stricture into a footwear-structure bag.

In addition to the shape tooling, other shape mechanisms may be used to form designs and patterns in the port-injected footwear. For example, FIG. 14a provides shape mechanisms used to constrain the shape of the footwear-structure bag during injection and expansion. Shown are an example stitch 400, adherence or weld 402, tether 404, welded or stitched loop 406, and tensile fabric 408 which may be welded or adhered to the interior of the footwear-structure bag 410.

Figure 14B:
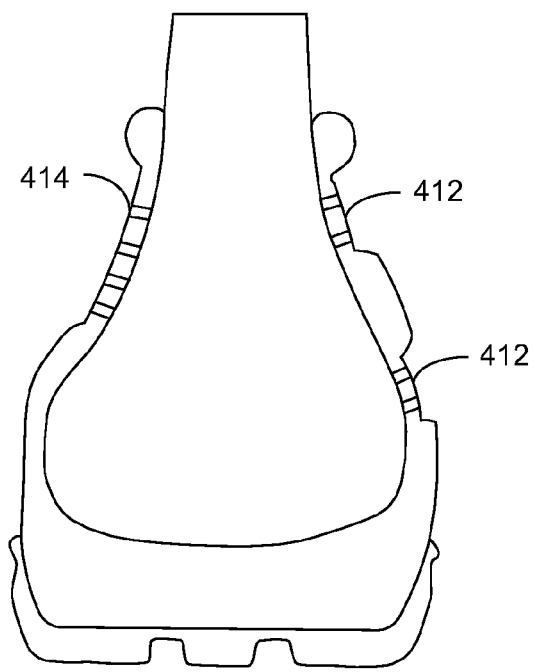

It further should be appreciated that the shape mechanisms may be confined to local spots or extended areas of constraint as seen in the example footwear article shown in FIG. 14b. In FIG. 14b, for example, stitching is used to retain a width of the footwear-structure bag in an extended area 414 and at local spots 412. The stitching shown in FIG. 14b may comprise an alternate form of providing a stricture into the hollow bag structure in alternate embodiments. Further the strictures may adapt to points, lines, patterns or quilting.

In some examples, the shape mechanisms may fully constrict the footwear-structure bag, directly joining both surfaces of the footwear-structure bag. Alternatively, shape mechanisms, such as those shown in FIG. 14a, may distance the surfaces of the hollow bag structure by a fixed or variable amount. In some embodiments, and not as a limitation, variable spacing may be applied to a strip tack where the spacing between the two surfaces changes along the length of the strip.

The above examples are provided for illustrative purposes only and are not intended to limit the disclosure in any way. Alternative methods and shape mechanisms may be used to attach, compress, or otherwise alter the shape and design of the footwear-structure bag of the port-injection footwear disclosed herein.

Figure 15:
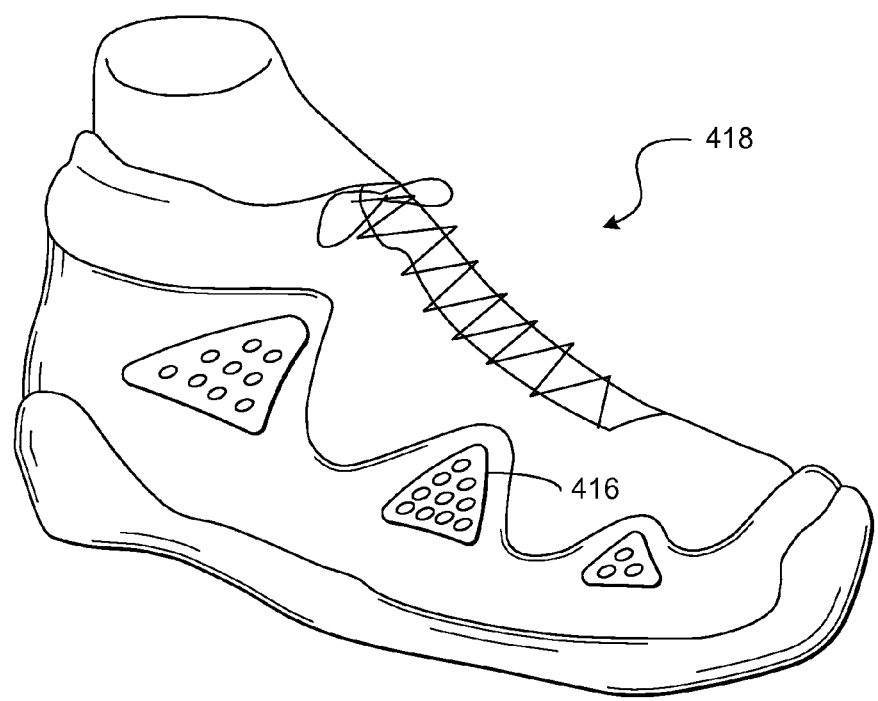
FIG. 15 is an illustration of port-injection footwear with perforated side sections.

In addition to the above described surface features, perforations and other cut-outs may be utilized. FIG. 15 illustrates the use of perforated windows 416 in example port-injection footwear 418. Such features may be constructed as air-management features or design features and may be used alone or in combination as desired. These perforated windows and other such elements may be constructed of breathable fabric, mesh, wicking fabric, or other material. The windows may additionally be cut out sections as seen in cut-out sections 128 of FIGS. 1a-c.

In one example, windows or cut-outs within the footwear-structure bag may be constructed prior to inflation with injected foam. Care may be taken to ensure that channels exist in the footwear-structure bag to enable foam to surround or encapsulate such windows or cut-outs.

Figure 16:
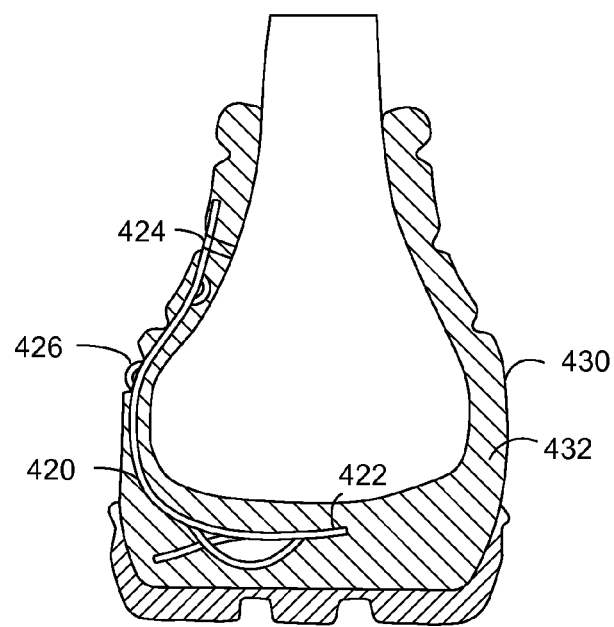
FIG. 16 is a cross-sectional view of another example of port-injection footwear with interior structural elements disposed within the footwear-structure bag.

Turning now to FIG. 16, a further illustration of an example port-injection footwear is provided. Specifically, in this example, the bag structure may include encapsulated features or structures for support or design construction. The encapsulated features may be structures to provide additional support, attachment point for other footwear systems, cushioning or impact protection. The encapsulated features may be contained or substantially contained within the hollow bag structure such that the injected foam surrounds or at least partially surrounds the encapsulated features making such features part of the completed body. Foam may be injected such that it expands around or substantially around the encapsulated features. These features may be wholly contained within the hollow bag structure, such as cushioning strips, or in some embodiments, may, in areas, show through to the exterior of the hollow bag structure.

In FIG. 16, footwear-structure bag 430 is injected with foam 432. An internal support structure 420 (such as a plastic support structure) may be encapsulated within the bag structure. The encapsulated structure piece or support structure may provide enhanced structure to a selected part of the shoe body. Similarly, encapsulated cushioning strips 422 may be positioned within the hollow bag structure 430. Selected materials for the internal structures may be based on support or cushioning desires.

As discussed above, in some embodiments, the interior structures may be disposed internal of the footwear-structure bag and may form part of the external surface of the article of footwear. In other examples, extension structures may extend from the footwear-structure bag. Example extension strictures may include webbing 424 or eyelet 426 which may form part of the exterior of the port-injection footwear article.

Figure 17A:
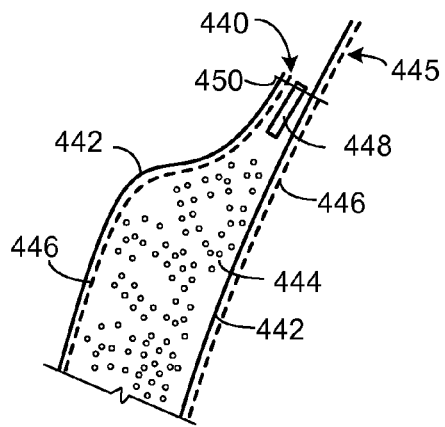
FIG. 17a is a cross-sectional view of a seam in a footwear-structure bag.
Figure 17B:
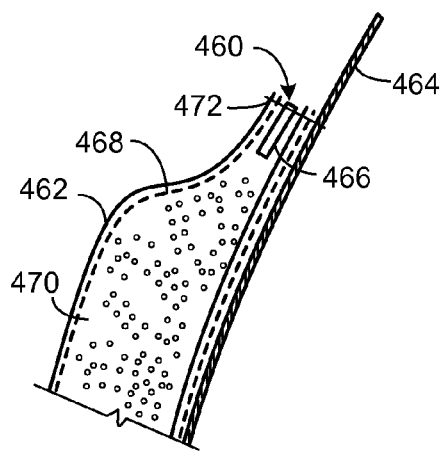
FIG. 17b is a cross-sectional view of a seam in a footwear-structure bag with an interior lining.
Figure 17C:
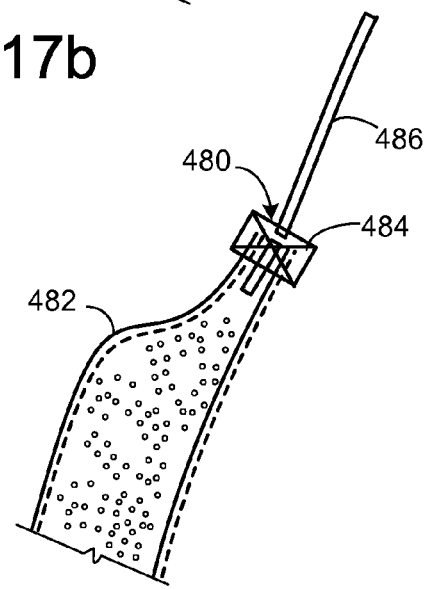
FIG. 17c is a cross-sectional view of a seam in a footwear-structure bag with an attached non foam-filled upper.

FIGS. 17a-c further detail example seams in a footwear-structure. In FIG. 17a, seam 440 in the footwear-structure bag 442 is shown where a surface of the bag structure material extends beyond a foam filled portion 444. The footwear-structure bag material has, a foam barrier 446.

In this example, seam 440 comprises an adhesive layer 448 bonding the two layers of footwear structure bag 442 and its foam barrier 446. The seam 440 also comprises stitching 450. Stitching may increase the durability of the seam or may be provided for aesthetic purposes. In this example, the material of footwear-structure bag 442, and its foam barrier 446, extend beyond the foam filled portion 444 in a region 445. This extension region 445 of the material may, for example, create an area of an article of footwear with increased flexibility, may contribute to weight savings in an article of footwear, or may provide an aesthetic element to the surface of an article of port-injection footwear. It should be appreciated that, in other examples, the footwear-structure bag may not extend beyond the foam filled portion as seen in FIGS. 17b and 17c described below.

FIG. 17b shows a seam 460 in a footwear-structure bag 462 with an attached interior lining 464 such as that shown in FIG. 8b. Interior lining 464 may comprise a breathable material that lines the foot-facing surface of an article of port-injection footwear. In the example shown in FIG. 17b the interior lining extends beyond a section of the footwear-structure bag 462 but in another embodiment an interior lining may be confined to the same area as the footwear-structure bag or a smaller area therein.

In this example, the seam 460 comprises an adhesive layer 466 which bonds the two surfaces of footwear-structure bag 462, and its foam barrier 468 together such that the footwear-structure bag may retain foam 470. In the example shown in FIG. 17b, the interior lining 464 is attached to the footwear-structure bag by stitch 472. In an alternative embodiment, an interior lining may be adhered to the footwear structure bag by another method such as by gluing, stitching, etc. Furthermore, the interior lining may be attached to the footwear-structure bag in other locations and at multiple attachment points.

In FIG. 17c, a flat joint 480 is shown where two edges of a footwear-structure bag 482 join. In the embodiment shown here, flat joint 480 is a zig-zag stitch 484 to join the two layers of hollow bag structure 482 to material 486. It should be appreciated, that in other example, other stitches may be used. In some examples, material 486 may comprise webbing or cord used to connect or lace together pieces of an article of port-injection footwear. Material 486 may, in an alternate embodiment, comprise a textile that may confer increased flexibility, breathability or stylistic features to an area of an article of port-injection footwear.

In another embodiment, a flat joint may comprise a flat lock stitch, weld, or involve an additional component such a rubber or plastic cap adhered or stitched at the seam.

As described above in the footwear-structure bag may be created where two edges of the material comprising the footwear-structure bag meet. An example of such a seam in the context of an article of port-injection footwear is described above in reference to seam 139 shown in FIG. 1b. Furthermore, a seam in a footwear-structure bag may be located in other areas of a footwear structure bag and used to create restrictions within the footwear structure bag for patterning, quilting, or performance purposes. Additionally, the seams shown in FIGS. 17a-c are depicted with an adhesive layer and stitching. However, it should be appreciated that a seam within a footwear-structure bag may be made using one or the other technique or in conjunction with other seaming methods such as welds, rivets, etc.

Figure 18:
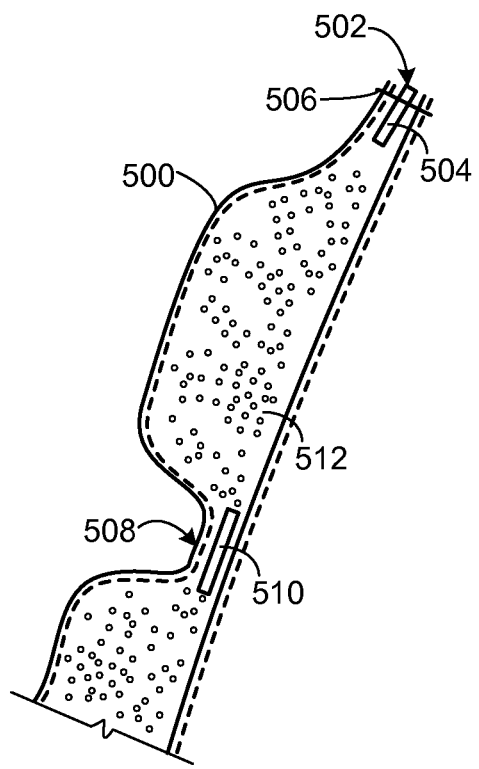
FIG. 18 is a cross-sectional view of a footwear-structure bag detailing the interior structure of an example design feature.

FIG. 18 shows further detailing of a footwear-structure bag in accordance with the present disclosure. A cross-sectional view of a piece of a footwear-structure bag 500 is shown with a seam 502 where two edges of the footwear-structure bag 500 meet. This seam 502 comprises an adhesive layer 504 and stitch 506. In an alternative embodiment, the seam may take on variations as described above or further comprise elements such as those shown in FIGS. 17a-c, as examples.

The footwear-structure bag 500 shown in FIG. 18 further comprises an area of constriction 508. In the present example, the constriction is provided by an adhesive layer 510 joining the two layers of footwear structure bag 500. The adhesive joining of the two layers of the footwear structure bag may be suitable to prevent injected foam 512 from permeating constriction 508. Such a constriction may be used to create design elements in an article of footwear and may further comprise stitching, riveting or welding. Furthermore, a large constricted area may be created where no injected foam may fill between the two layers of a footwear-structure bag. Such a large area could further be cut to create perforations or cut-out windows for example.

Figure 19:
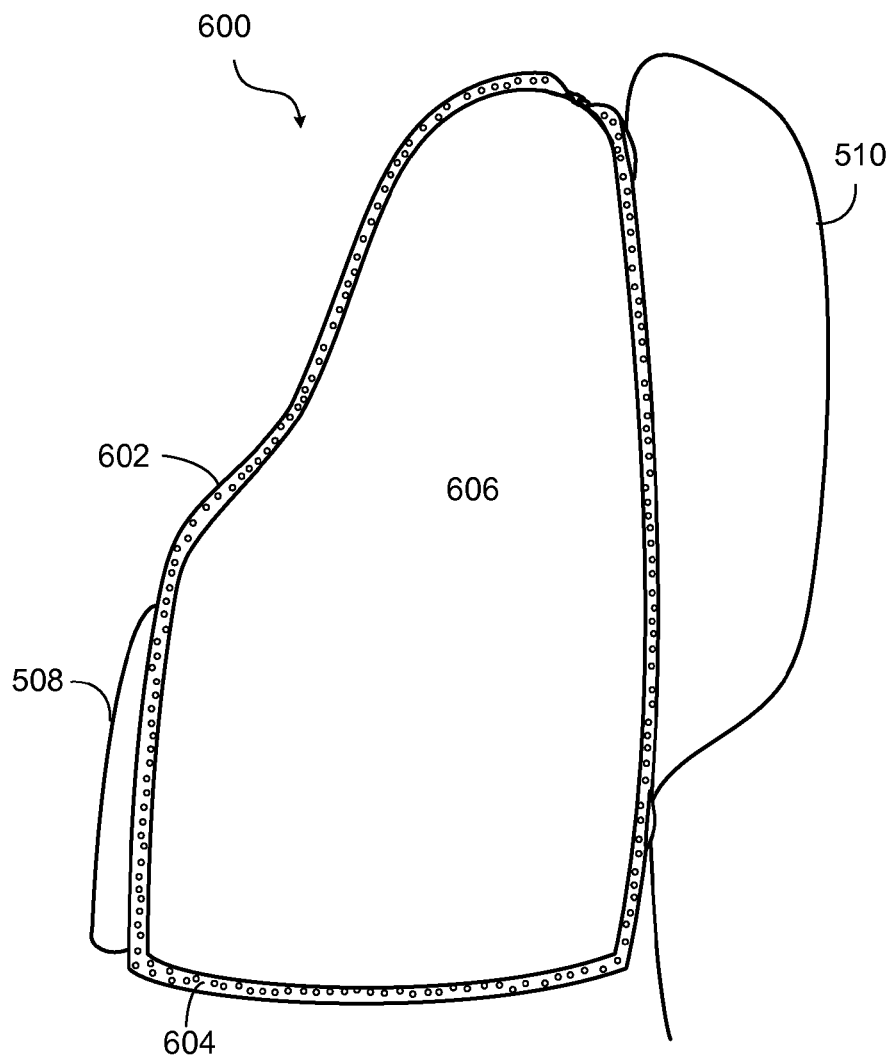
FIG. 19 is an illustration of a backpack constructed of a hollow bag structure in accordance with the present disclosure.

Methods in accordance with the present disclosure have been described as they pertain to creation and construction of articles of footwear. However, the method and hollow bag structure may be applied to construction of additional items. This may include, for example, bags, backpacks, totes, satchels, luggage, toiletry cases, etc. Such an example is shown in FIG. 19 where a backpack 600 is created when a hollow bag structure 602 is injected with foam 604. In the example of a bag, the hollow bag structure may be fit around an inner mold 606. The inner mold may be analogous to a last or footform used in the construction of an article of footwear. Furthermore, the hollow bag structure 602 may be fitted with external features such as a pocket 508 or strap 510 as non-limiting examples.

In addition to articles such as bags the method of the present disclosure could be adapted to construction of cushions, seats, supports, articles of clothing, or playthings as non-limiting examples.

As discussed above, in contrast to prior footwear construction relying heavily on adhesives, the primary construction herein is the port injection of the foam. Additionally, the requirement for multiple molds for each shoe size may not be required by the method in accordance with the present disclosure. Further, molds that are utilized for shaping and detailing may be more easily handled as they do not come in direct contact with injected foam.

As it should be appreciated, the disclosed port-injection footwear provides agility for quick short run solutions. Further, design opportunities are easily accommodated without requiring significant full run resources. Further, the disclosed direct injected footwear process and system provides enhanced customization. For example, the shell may be formed around a foot shape that matches the fit requirement of an individual. Further, aesthetic customization may be provided with soft tooling enabling individual and/or small production runs. For example, a user may customize footwear by inserting a unique icon or letters as an imprint on the footwear upper without requiring significant expensive tooling and time.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A footwear article comprising:
a footwear-structure bag comprising a first material, encompassing an injected foam, the injected foam comprising a second material compositionally different than the first material, wherein the injected foam comprises a foam that is injected into the footwear-structure bag, and where at least a portion of the footwear-structure bag has a stretch property that causes the footwear-structure bag to expand when the foam is injected into the footwear-structure bag, the footwear-structure bag forming an integrated footwear component, where at least a portion of the footwear-structure bag extends to an external exterior-facing surface of the footwear article and is integrated within an upper of the footwear article, defining at least a portion of an exterior surface of the footwear article, where the external exterior-facing surface is opposed to an internal foot-facing surface;
a foam barrier disposed adjacent to an outer surface of the footwear-structure bag to retain the injected foam within the footwear-structure bag during injection; and
an outsole directly coupled to the footwear-structure bag forming a base of the footwear article.

2. The footwear article of claim 1, wherein the foam barrier is a waterproof coating, wherein the footwear-structure bag is a first footwear-structure bag and the injected foam is a first injected foam, the footwear article comprising a second footwear-structure bag encompassing a second injected foam that has different material properties than the first injected foam.

3. The footwear article of claim 1, wherein the foam barrier is coupled to an internal facing surface of the footwear-structure bag.

4. The footwear article of claim 1, wherein the foam barrier and footwear-structure bag form a two-layer construction, and where the foam barrier is on an opposite surface of sections of the footwear-structure bag such that the foam barrier is on an internal facing surface of the footwear-structure bag in a first section and on an external facing surface of the footwear-structure bag in a second section.

5. The footwear article of claim 1, wherein the integrated footwear component comprises a portion of an upper.

6. The footwear article of claim 1, wherein the footwear-structure bag includes a plurality of surface features.

7. The footwear article of claim 6, wherein the surface features include one of a foot-facing feature and an exterior feature.

8. The footwear article of claim 1, further comprising a port cap positioned at an injection port of the footwear-structure bag.

9. The footwear article of claim 8, wherein the port cap is disposed on the exterior surface of the footwear article.

10. The footwear article of claim 1, wherein the foam is polyurethane.

11. The footwear article of claim 1, wherein the footwear-structure bag forms one of a sidewall and a strap.

12. A port-injection footwear article having an upper and a lower, the port-injection footwear article comprising:
a flexible footwear-structure bag having an injection port and a port cap positioned at the injection port, where at least a portion of the footwear-structure bag extends from an internal foot-facing surface to an external exterior-facing surface of the footwear article; and
an injected foam retained in the footwear-structure bag and comprising a compositionally different material than the flexible footwear-structure bag, where the injected foam is injected through the injection port of the footwear-structure bag into the footwear-structure bag, and is retained within the footwear-structure bag by the port cap by permanently securing the port cap to the injection port after the injected foam is injected into the footwear-structure bag, and where at least a first section of the footwear-structure bag has a first stretch property that causes the footwear-structure bag to elongate as the injected foam is injected into the footwear-structure bag.

13. The port-injection footwear article of claim 12, wherein the port cap is sized to substantially a size of a port injector and where the port cap extends to an exterior surface of the footwear-structure bag.

14. The port-injection footwear article of claim 12, where the footwear-structure bag is a portion of the upper.

15. The port-injection footwear article of claim 12, wherein the footwear-structure bag is configured to extend over a portion of a user's foot, and wherein a second section of the footwear-structure bag has a second stretch property that has a different elasticity than the first stretch property.

16. The port-injection footwear article of claim 12, further comprising an outsole, where the footwear-structure bag is coupled directly to the outsole.

17. The port-injection footwear article of claim 12, further comprising a foam barrier adjacent to the footwear-structure bag.

18. A footwear article comprising:
- a first footwear-structure bag forming a portion of an upper and having a foam barrier disposed at least partially on an internal-facing surface of the first footwear-structure bag to form an additional layer or coating coupled to the internal-facing surface, where at least a portion of the first footwear-structure bag extends from an internal foot-facing surface to an external exterior-facing surface of the footwear article;
- a first injected foam core encapsulated within the first footwear-structure bag, the first injected foam core encapsulated within the first footwear-structure bag via injection of the first injected foam core directly into the first footwear-structure bag via a port, and where the first footwear-structure bag expands as the first injected foam core is injected into the first footwear-structure bag;
- a cap permanently secured to the port in the first footwear-structure bag after injection of the first injected foam core into the first footwear-structure bag to retain the first injected foam core within the first footwear-structure bag; and
- an outsole directly coupled to the first footwear-structure bag.

19. The footwear article of claim 18, wherein a stitch forms part of an exterior feature and where the stitch extends through the first footwear-structure bag.

20. The footwear article of claim 18, wherein the foam barrier is a waterproof coating.

21. The footwear article of claim 18, further comprising a second footwear-structure bag forming a second portion of the upper.

22. The footwear article of claim 21, wherein the second footwear-structure bag encapsulates a second foam core where the second foam core is a different material than the first foam core.

* * * * *